(12) United States Patent
Liu et al.

(10) Patent No.: US 11,341,516 B2
(45) Date of Patent: May 24, 2022

(54) OPTIMIZATION OF SEND TIME OF MESSAGES

(71) Applicant: Adobe Inc., San Jose, CA (US)

(72) Inventors: Xinyue Liu, San Jose, CA (US); Suofei Wu, San Jose, CA (US); Chang Liu, Piscataway, NJ (US); Jun He, San Jose, CA (US); Zhenyu Yan, San Jose, CA (US); Wuyang Dai, Santa Clara, CA (US); Shengyun Peng, San Jose, CA (US)

(73) Assignee: Adobe Inc., San Jose, CA (US)

( * ) Notice: Subject to any disclaimer, the term of this patent is extended or adjusted under 35 U.S.C. 154(b) by 60 days.

(21) Appl. No.: 16/877,385

(22) Filed: May 18, 2020

(65) Prior Publication Data

US 2021/0357952 A1 Nov. 18, 2021

(51) Int. Cl.
| | |
|---|---|
| *G06Q 30/02* | (2012.01) |
| *H04L 51/56* | (2022.01) |
| *G06Q 10/10* | (2012.01) |

(52) U.S. Cl.
CPC ....... *G06Q 30/0201* (2013.01); *G06Q 10/107* (2013.01); *H04L 51/36* (2013.01)

(58) Field of Classification Search
USPC ....................................................... 705/14.1
See application file for complete search history.

(56) References Cited

U.S. PATENT DOCUMENTS

2015/0381552 A1* 12/2015 Vijay ................ H04L 43/08
709/206

OTHER PUBLICATIONS

Rubin, Donald B., Causal inference using potential outcomes: Design. Modeling, Decisions, 2011.

(Continued)

*Primary Examiner* — Waseem Ashraf
(74) *Attorney, Agent, or Firm* — Keller Preece PLLC

(57) ABSTRACT

Introduced here are approaches for identifying the optimal send time for messages by accounting for hidden confounders, such as the content of those messages, delivery channel, etc. These approaches use a causal inference framework to discover and then remove the impact of hidden confounders. These approaches may be employed by a marketing and analytics platform (or simply "marketing platform") that may be used to design, implement, or review digital marketing campaigns. The marketing platform can consider the send time as a treatment and then employ machine learning (ML) models that consider the send time, features of the recipient, and hidden confounders to produce a ranked series of send times with the effect of the hidden confounders marginalized. Approaches to performing offline evaluations that mimic A/B tests using data related to existing field experiments are also introduced here.

20 Claims, 18 Drawing Sheets

(56) References Cited

OTHER PUBLICATIONS

Gerber, Alan S., and Donald P. Green. "Field experiments and natural experiments." The Oxford handbook of political science., 2011.

Simester, Duncan, Artem Timoshenko, and Spyros I. Zoumpoulis. "Customizing Marketing Decisions Using Field Experiments", 2016.

Uri Shalit & David Sontag, Causal inference for observational studies, 2016, 2016.

Huang, Jason, David Reiley, and Nick Riabov. "Measuring Consumer Sensitivity to Audio Advertising: A Field Experiment on Pandora Internet Radio." Available at SSRN 3166676, 2018.

Judea Pearl, Causal inference in statistics: An overview, 2009, Sep. 2009.

\* cited by examiner

Date Coverage Percentage: 45%

| | Time_ID$_1$ | Time_ID$_2$ | Time_ID$_3$ | Time_ID$_4$ | Time_ID$_5$ |
|---|---|---|---|---|---|
| Delivery_ID$_1$ | | 0.11 | | | |
| Delivery_ID$_2$ | 0.15 | 0.20 | 0.12 | 0.09 | |
| Delivery_ID$_3$ | 0.22 | | 0.10 | | 0.22 |
| Delivery_ID$_4$ | | | 0.08 | | |

1201
Obtain data related to a field experiment in which recipients were subjected to varying levels of audio advertising 1202
Obtain data related to a first ML model and a second ML model 1203
Identify a first mimic treatment group that includes recipients in the field experiment that happened to adopt the level of audio advertising recommended by the first ML model 1204
Identify a second mimic treatment group that includes recipients in the field experiment that happened to adopt the level of audio advertising recommended by the second ML model 1205
Calculate a desired metric for the first and second mimic treatment groups 1206
Evaluate the first and second ML models by comparing the metrics

FIGURE 12

OPTIMIZATION OF SEND TIME OF MESSAGES

TECHNICAL FIELD

Various embodiments concern computer programs and computer-implemented techniques for discovering the optimal times to send messages to maximize the response rate of recipients.

BACKGROUND

Digital marketing utilizes Internet-based technologies to promote products. Over the last several decades, digital marketing has increasingly become part of everyday life as its different forms have become commonplace. Now, for instance, marketers routinely conduct digital marketing campaigns (also referred to as "digital advertising campaigns") on behalf of retailers to reach new customers and/or engage past customers.

Normally, a digital marketing campaign will be performed across multiple channels in order to maximize its effectiveness. Popular channels include email, text messages, and social media due to the low costs and widescale usage. However, messages delivered via these channels can easily be perceived as bothersome or irritating by recipients, so the success of digital marketing campaigns depends on identifying an appropriate target audience, creating an appealing message, and sending the message to the target audience at an appropriate time.

BRIEF DESCRIPTION OF THE DRAWINGS

FIG. 5 includes an example of a data structure that illustrates the concept of data coverage.

FIG. 12 depicts a flow diagram of a process for using mimic A/B tests to evaluate customized audio advertising strategies employed by an Internet-based radio company that provides free ad-supported music services to its recipients.

Figure 1:
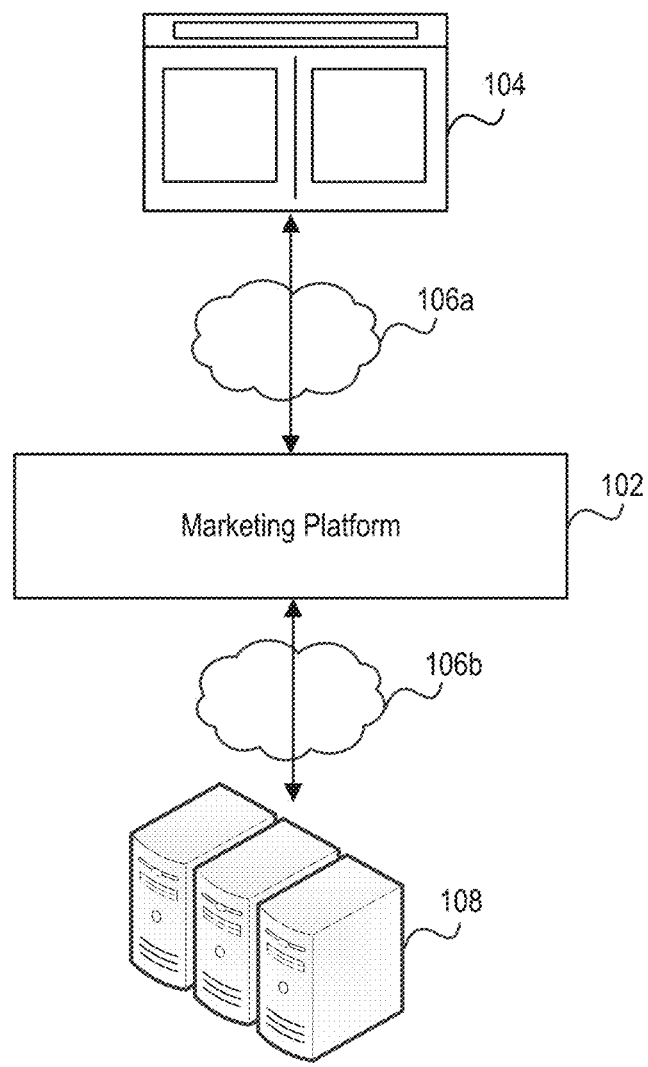
FIG. 1 illustrates a network environment that includes a marketing platform able to execute instructions for establishing the optimal time at which to send messages to recipients as part of a digital marketing campaign using models.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

Digital marketing campaigns involve sending messages that include information related to products offered by retailers to target populations of individuals. Examples of messages include emails, push notifications, and communications on social media networks. Establishing the impact of messages transmitted as part of a digital marketing campaign can be accomplished in a fairly straightforward manner, for example, by monitoring the response rate to those messages. The term "response rate" refers to indices of interaction with messages, such as the open rate, click rate, or conversion rate. The term "open rate" refers to the percentage of recipients who opened the message, the term "click rate" refers to the percentage of recipients who followed a link in the message, and the term "conversion rate" refers to the percentage of recipients who purchased the product described in the message.

Various factors influence the response rate, however, so it can be difficult to establish how to improve a digital marketing campaign. Thus, the outcome (i.e., whether a recipient responds to a message) may be viewed as a compound effect of factors such as the time at which the message was sent (also referred to as the "send time" or "transmittal time"), features of the recipient, and hidden confounding variables (also referred to as "confounders").

Several approaches have been developed in an attempt to identify the optimal time at which to send messages. Examples of such approaches include A/B testing, rule-based modeling supplemented with human feedback, and monitoring population-level indicators. Each of these approaches has drawbacks, however. In A/B testing, two variants (e.g., a first send time and a second send time) are compared based on the respective response rates. But this can make it difficult, if not impossible, to compare a wide variety of send times in a time- and resource-efficient manner. In rule-based modeling, the solutions are not optimal since they are not data driven and may rely on human bias. And in population-level indicators, the optimal send time is based on aggregated data for a population of recipients and thus cannot be optimized on an individual basis.

In additional to the aforementioned disadvantages, all of these approaches suffer from a common problem, namely, the inability to account for the effect of hidden confounders on the response rate of recipients. Since these approaches are unable to identify the true impact that send time has on the response rate, any predictions of the optimal send time will be biased.

Introduced here, therefore, are approaches for identifying the optimal send time for messages by accounting for hidden confounders, such as the content of those messages, delivery channel, etc. In contrast to the above-mentioned approaches, these approaches use a causal inference framework to discover and then remove the impact of hidden confounders. These approaches may be employed by a marketing and analytics platform (or simply "marketing platform") that includes analytics, advertising, media optimization, or content management products that may be useful in designing, implementing, and reviewing digital marketing campaigns. As further discussed below, the marketing platform can consider the send time as a treatment and then employ machine learning (ML) models that consider the send time, features of the recipient, and hidden confounders to produce a ranked series of send times with the effect of the hidden confounders marginalized. At a high level, an ML model (or simply "model") is a realization of one or more ML algorithms with specific structures/parameters that produce outputs (also referred to as "predictions" or "recommendations"). Such an approach enables the marketing platform to discover the optimal time at which to send messages in order to maximize the response rate of recipients.

Note that the causal inference framework described herein may be referred to as an "extended" framework since these approaches extend the traditional scenario of binary treatment with homogenous effects to which causal inference has historically been applied to a new scenario of multiple treatments (e.g., multiple send times) with heterogenous effects (e.g., different recipients may prefer different send times).

Although not required, implementations are described below in the context of computer-executable instructions, such as routines executed by a general-purpose computing device. The term "computing device" may be used interchangeably with computer servers, personal computers, mobile phones, and the like.

While aspects of the technology, such as certain functions or modules, may be described as being performed exclusively or primarily on a single computing device, some implementations are practiced in distributed environments where functions/modules are shared among multiple computing devices that are linked through a network, such as a local area network (LAN), wide area network (WAN), or the Internet. In a distributed computing environment, modules can be located in both local and remote storage devices.

Aspects of the technology can be stored or distributed on tangible computer-readable media, including magnetically or optically readable computer discs, hardwired or preprogrammed chips (e.g., EEPROM semiconductor chips), nanotechnology memory, biological memory, or other non-transitory data storage media. In some embodiments, computer-executable instructions, data structures, and other information can be distributed over the Internet (or another network) on a propagated signal or a propagation medium (e.g., an electromagnetic wave or a sound wave) over a period of time, or these materials can be provided on an analog or digital network (e.g., packet switched, circuit switched, or other scheme).

In one example, a set of algorithms indicative of a model designed to identify the optimal time at which to send a message to a recipient may be executed by a marketing platform through which an individual may design, implement, and review digital marketing campaigns. The marketing platform could be embodied as a software program that offers an end-to-end solution for digital marketing. In particular, the marketing platform may prompt a processor to execute computer-executable instructions for obtaining data related to messages sent to recipients over a past interval of time, generating a series of temporal identifiers corresponding to different subsets of the past interval of time, assigning each message a temporal identifier based on the time at which the message was sent, calculating a propensity score for each temporal identifier based on the labels of any messages assigned that temporal identifier, and employing a model to estimate the expected response rate for each temporal identifier. As further discussed below, the model may be designed to produce an ordered list of temporal identifiers that are sorted based on the expected response rate. Thus, the marketing platform may be able to readily identify the temporal identifier associated with the highest expected response rate.

Overview of Marketing Platform

FIG. 1 illustrates a network environment 100 that includes a marketing platform 102 able to execute instructions for establishing the optimal time at which to send messages to recipients as part of a digital marketing campaign using models. The marketing platform 102 may also be able to execute instructions for performing A/B tests in an effort to compare a pair of models. As further discussed below, the marketing platform 102 may be comprised of a series of modules operable to obtain data related to messages sent to recipients as part of a digital marketing campaign, assign temporal features to those messages, estimate a response rate for each temporal feature by applying a model to the corresponding messages, and then generate an ordered list of temporal features that is sorted by the estimated response rate. The term "module" refers broadly to software components, firmware components, and/or hardware components. Accordingly, aspects of the marketing platform 102 could be implemented in software, firmware, and/or hardware.

As shown in FIG. 1, individuals can interface with the marketing platform 102 via an interface 104. An example of a marketing platform 102 is a software program through which individuals can access analytics, advertising, media optimization, or content management products that may be useful in designing, implementing, and reviewing digital marketing campaigns. The marketing platform 102 may be responsible for creating the interfaces through which these products can be employed.

In some embodiments, the messages to be examined are sent by the marketing platform 102. In other embodiments, the messages to be examined are uploaded to the marketing platform 102. For example, an individual may access the marketing platform 102 and then select, via an interface generated by the marketing platform 102, data related to the messages from a memory for examination. As another example, an individual may access the marketing platform 102 and then identify, via an interface generated by the marketing platform 102, an advertising service responsible for sending the messages. In such a scenario, the marketing platform 102 may acquire the data related to the messages from the advertising service (e.g., via an application programming interface).

As noted above, the marketing platform 102 may reside in a network environment 100. Thus, the marketing platform 102 may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the marketing platform 102 can be communicatively coupled to computing device(s) over a short-range communication protocol, such as Bluetooth® or near-field communication (NFC).

The interface 104 is preferably accessible via a web browser, desktop application, mobile application, and/or over-the-top (OTT) application. Accordingly, the interface 104 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some embodiments of the marketing platform 102 are hosted locally. That is, the marketing platform 102 may reside on the computing device used to access the interface 104. For example, the marketing platform 102 may be embodied as a desktop application executing on a personal computer or a mobile application executing on a mobile phone. Other embodiments of the marketing platform 102 are executed by a cloud computing service operated by Amazon Web Services® (AWS), Google Cloud Platform™, Microsoft Azure®, or a similar technology. In such embodiments, the marketing platform 102 may reside on a network-accessible server system 108 comprised of one or more computer servers. These computer servers 108 can include different types of data (e.g., data related to messages and responses to those messages), user information (e.g., profiles and credentials), and other assets. Those skilled in the art will recognize that the modules of the marketing platform 102 could also be distributed amongst a computing device and a network-accessible server system.

Embodiments are described in the context of network-accessible interfaces. However, those skilled in the art will recognize that the interfaces need not necessarily be accessible via a network. For example, a computing device may execute a self-contained computer program that does not require network access. Instead, the self-contained computer program may download assets (e.g., data regarding messages sent as part of a digital marketing campaign, data regarding responses to those messages, models, and processing operations) at a single point in time or on a periodic basis (e.g., weekly, daily, or hourly).

Figure 2:
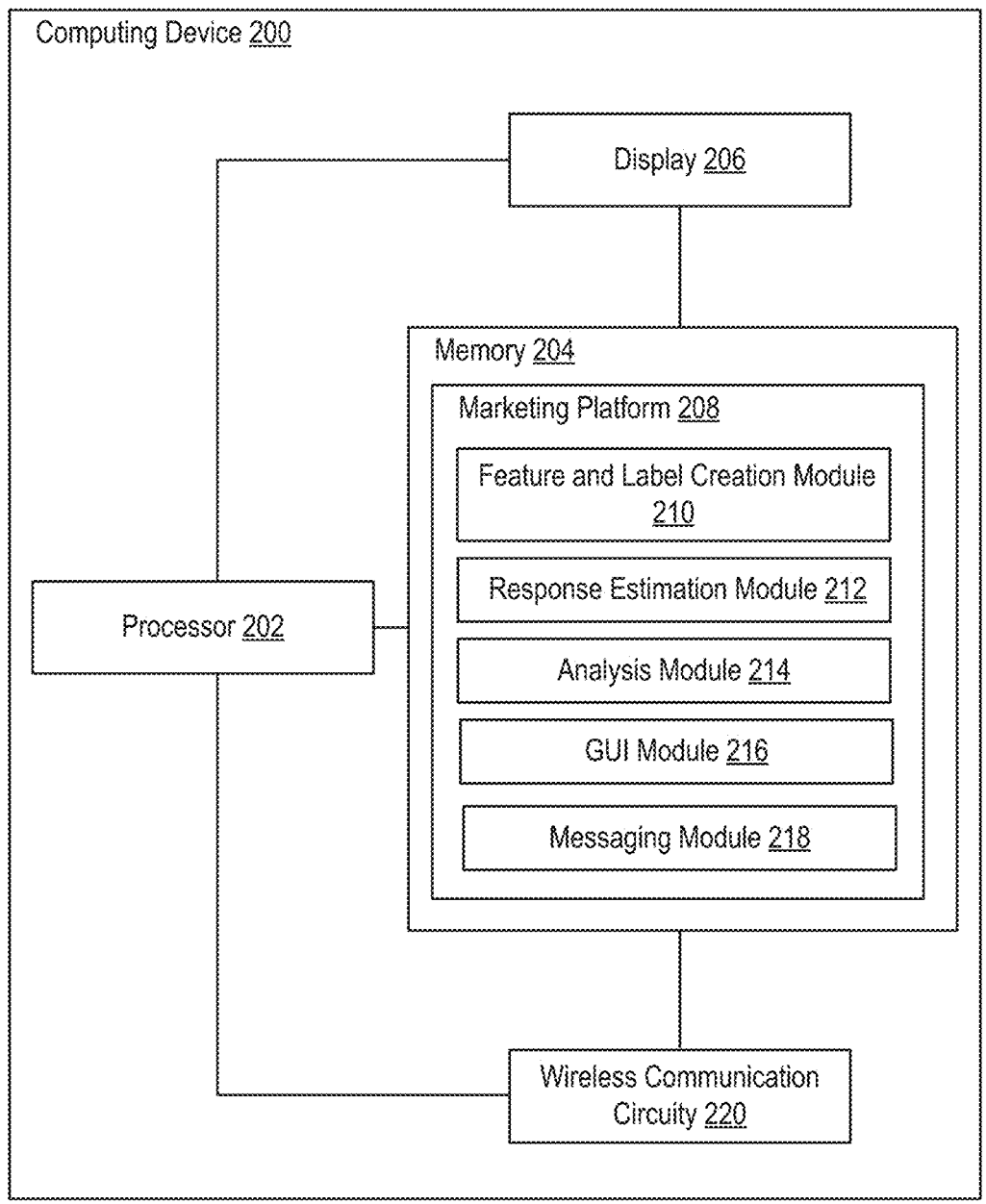
FIG. 2 illustrates an example of a computing device capable of implementing the techniques described herein.

FIG. 2 illustrates an example of a computing device 200 capable of implementing the techniques described herein. Note that the components shown in FIG. 2 are merely illustrative. Components that are well known are not shown for simplicity. Referring to FIG. 2, the computing device 200 includes a processor 202, a memory 204, and a display 206. The computing device 200 may also include wireless communication circuitry 220 designed to establish wireless communication channels with other computing devices. The processor 202 can have generic characteristics similar to general-purpose processors, or the processor 202 may be an application-specific integrated circuit (ASIC) that provides arithmetic and control functions to the computing device 200. While not shown, the processor 202 may include a dedicated cache memory. The processor 202 can be coupled to all components of the computing device 200, either directly or indirectly, for data communication.

The memory 204 may be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 202, the memory 204 can also store data generated by the processor 202 (e.g., when executing the modules of the marketing platform 208). Note that the memory 204 is merely an abstract representation of a storage environment. In some embodiments, the memory 204 is comprised of one or more actual memory chips or modules.

The display 206 can be, for example, a touch-enabled display or a non-touch-enabled display—in which case the computing device 200 likely also includes (or is connected to) an input device such as a keyboard.

The wireless communication circuitry 220 can form and/or communicate with a network for data transmission among computing devices, such as personal computers, mobile phones, and computer servers. The wireless communication circuitry 220 can be used for communicating with these computing devices or for connecting to a higher-level network (e.g., a LAN) or the Internet. Examples of wireless communication circuitry 220 include Bluetooth, Z-Wave, ZigBee, and the like. In some embodiments, the connection established by the wireless communication circuitry 220 can be bootstrapped by a near field communication (NFC) connection.

For convenience, the marketing platform 208 may be referred to as a computer program that resides within the memory 204. However, as noted above, the marketing platform 208 could be comprised of software, firmware, and/or hardware components implemented in, or accessible to, the computing device 200. In accordance with some embodiments of the techniques described herein, the marketing platform 208 includes a feature and label creation module 210, a response estimation module 212, and an analysis module 214. Similar to the marketing platform 208, each of these modules can be implemented via software, firmware, and/or hardware. As illustrated in FIG. 2, these modules can be an integral part of the marketing platform 208. Alternatively, these modules can be logically separate from the marketing platform 208 but operate "alongside" it. Together, these modules may enable the marketing platform 208 to establish the optimal time at which to send a message to a given recipient as part of a digital marketing campaign.

Initially, the marketing platform 208 can obtain source data (or simply "data") related to messages sent to recipients as part of a digital marketing campaign. The data could be acquired from the memory 204 upon receiving input indicative of a selection of the digital marketing campaign, the recipients, etc. Alternatively, the data may be automatically acquired by the marketing platform 208 responsive to determining that an individual has indicated an interest in initiating another digital marketing campaign related to the same product or recipients involved in the digital marketing campaign.

The feature and label creation module 210 can establish a feature set and a label indicative of a response status for each message based on an analysis of the data. Generally, the data is comprised of raw message data and/or raw delivery logs. Accordingly, each feature set may include (i) recipient features that belong to a recipient or sub-population, such as country, region, age, etc., (ii) a temporal feature based on the time at which the message was sent, and (iii) a confounder variable representative of a confounder for which information is not included in the data. These feature sets enable the messages to be readily grouped together based on shared features. For example, the feature and label creation module 210 may be designed to sort the messages into groups based on the temporal features so that a different group of messages is created for each temporal feature.

The response estimation module 212 can then estimate the response rate for each temporal feature by applying a machine learning (ML) model (or simply "model") to the label and accompanying feature sets. As further discussed below, the model may be designed to produce an estimated response rate for a given temporal feature as output given the label and feature sets as input.

The analysis module 214 may attempt to find the optimal time at which to send a message based on the estimated response rates produced by the response estimation module 212. For example, the analysis module 214 may generate an ordered list of temporal features that is sorted by estimated response rate. Generally, the ordered list is sorted such that whichever temporal feature is associated with the highest estimated response rate is listed first. The analysis module 214 may store (e.g., in the memory 204) the ordered list in a data structure that is indicative of a profile associated with the message, product discussed in the message, enterprise associated with the message, recipients, etc.

Other modules could also be included as part of the marketing platform 208. For example, a graphical user interface (GUI) module 216 may be responsible for generating the interfaces through which an individual can interact with the marketing platform 208, view outputs produced by the aforementioned modules, etc. A visualization component (or simply "visualization") could include information regarding the ordered list of temporal features generated by the analysis module 214 may be posted by the GUI module 216 to an interface presented on the display 206. As another example, a messaging module 218 may be responsible for sending messages at the optimal times determined by the analysis module 214. Thus, in some embodiments, the marketing platform 208 may actually transmit the messages itself. In other embodiments, information regarding the optimal times may be transmitted (e.g., via the wireless communication circuitry 220) to a messaging system that is responsible for transmitting the messages.

Extended Causal Inference Framework for Optimizing Send Time

Introduced here are approaches for designing and then applying an extended causal inference framework to the problem of optimizing the delivery of messages to recipients. Examples of messages include emails, push notifications, and communications on social media networks. As further discussed below, a marketing platform may be designed to produce, for each potential recipient, a personalized, ordered list of send times that are ranked in terms of the likelihood of eliciting a response.

Multiple statistical approaches, namely, covariate adjustment and inverse-probability weighting—can be employed to remove the effect of confounders. A confounder is a variable that influences another variable to some degree causing a spurious association. The terms "hidden confounders" and "unknown confounders" may refer to confounders that impact the response rate but whose values are not known by the marketing platform. For instance, the content of a message will impact whether a recipient responds; however, the content could be represented as a hidden confounder if such information is not available to the marketing platform. Other examples of hidden confounders include the recipient's device, product category, etc.

Such an approach results in the traditional causal inference framework being extended in several respects. First, since the optimal send time is selected from amongst multiple send times, multivalued treatment is addressed rather than binary treatment. Second, since the send time might affect different recipients (or different messages) in different ways leading to different responses, the treatment effect can be viewed as heterogeneous.

A. Introduction of Source Data

Initially, the marketing platform can obtain source data (also referred to as "historical data") related to messages sent to recipients over a past interval of time. The source data is generally comprised of raw message data and/or raw delivery logs. Accordingly, for each message, the source data may contain (i) a timestamp indicative of the time at which the message was sent and (ii) one or more events that indicate, for example, whether the message was opened, whether a link included in the message was clicked, whether the message prompted the recipient to opt out of future messages, etc. The marketing platform can process the source data into inputs that can be handled by machine learning (ML) models as further discussed below. These inputs fall into two categories, namely, labels and features.

A label is normally a binary input whose value indicates whether the recipient interacted with the corresponding message in some matter. As such, the label may be representative of the response status as determined based on the events included in the source data. Thus, each label may specify whether a recipient opened the corresponding message, clicked a link included in the corresponding message, etc. Each message may be assigned a value of one if the recipient responded and a value of zero if the recipient did not respond.

Features, meanwhile, can be divided into the following categories:

Send Time Features: The send time is represented by a timestamp in the source data that specifies when the message was sent. This timestamp can be processed in various ways to generate send time features (also referred to as "temporal features" or "temporal identifiers"). For instance, the timestamps (and thus the messages) could be batched based on a desired granularity defined by an individual through an interface generated by the marketing platform. As an example, the timestamps could be batched into 24-hour buckets with the assumption that behavior is likely to repeat on a daily basis or 168-hour buckets with the assumption that behavior is likely to repeat on a weekly basis. The size (e.g., in terms of hours) of each bucket may be varied, manually or automatically, so that each bucket includes at least some timestamps.

Recipient Features: These features are representative of known attributes of the recipient or a sub-population of which the recipient is a part. Examples of sub-populations include recipients associated with certain countries, regions, age ranges, genders, industries, products, etc. The key concept for recipient features is that these are known attributes whose information is available in the source data, and therefore can be used when predicting the success of future messages. For example, if the location of a given recipient is known, then the location of the given recipient will still be known in the future if a message is to be sent to him/her.

Confounder Features: A confounder feature (also referred to as a "confounder identifier") is normally represented by a variable that is indicative of a confounder for which information is not included in the source data and can influence both dependent and independent variables. In short, a confounder is a feature representative of hidden information that will affect both response and treatment variables. It cannot be accounted for by a model unless a variable is included.

One example of a confounder is the content of messages. Although the content of a message may not be known to the marketing platform, it will affect both the response rate and send time. Since the goal is to predict the optimal send time for each recipient (or group of recipients) using models regardless of these cofounders, corresponding variables must be considered by those models.

As discussed above, the marketing platform may not have access to confounders, such as the content of the messages, if such information is not included in the source data. However, the marketing platform may be able to establish which messages were sent in the same delivery based on the corresponding timestamps. The marketing platform may sort a series of messages into groups based on the timestamps such that each group corresponds to a moment in time (e.g., 9:00 AM) or an interval of time (e.g., 9:00-9:05 AM). The marketing platform may assign a variable (Delivery_ID) to each message based on the timestamps such that messages sent in the same delivery are assigned the same variable. For example, messages determined to be part of a first delivery may be assigned a first variable (Delivery_ID$_1$), messages determined to be part of a second delivery may be assigned a second variable (Delivery_ID$_2$), etc. These variables represent a confounder feature (here, message content) for which information is not available. These variables may be assigned under the assumption that messages sent at the time are likely to have the same content.

When tasked with predicting the success of future messages, variables representing confounders such as content (as represented by Delivery_ID) will remain unknown to the marketing platform, and therefore cannot be used in the prediction process. However, the marketing platform may be able to remove confounders' effects on the response rate to more purely quantify preferences regarding send time that can guide the delivery of future messages by employing the approaches described below.

B. Causal Inference Framework for Optimizing Send Time

One significant challenge in drawing conclusions about causal connections from historical data related to past events is determining how to control/adjust for confounders. To address this challenge, the marketing platform can extend a causal inference framework so that it can address multivalued treatment. For the purpose of illustration, a simple scenario is discussed below in which content and send time are the only attributes that affect the response rate. Those skilled in the art will recognize that the same causal inference framework could be applied to scenarios with more attributes, either known or unknown. An example of a scenario with multiple known attributes—in the form of recipient features—is further discussed below.

Assume that the marketing platform is tasked with establishing the optimal send time in a scenario where only the content of messages and their send times affect the response rate. In this scenario, the marketing platform may represent the content with a first variable (Delivery_ID$_i$) and the send time with a second variable (Time_ID). More specifically, the marketing platform may receive input indicative of a desired temporal granularity, define a series of time intervals based on the desired temporal granularity, and then encode each time interval as an integer so that each time interval can be associated with a different variable (e.g., Time_ID$_1$, Time_ID$_2$, Time_ID$_3$, etc.). The second variable assigned to each message may be determined by the marketing platform based on a comparison of the corresponding timestamp to the series of time intervals.

Figure 3:
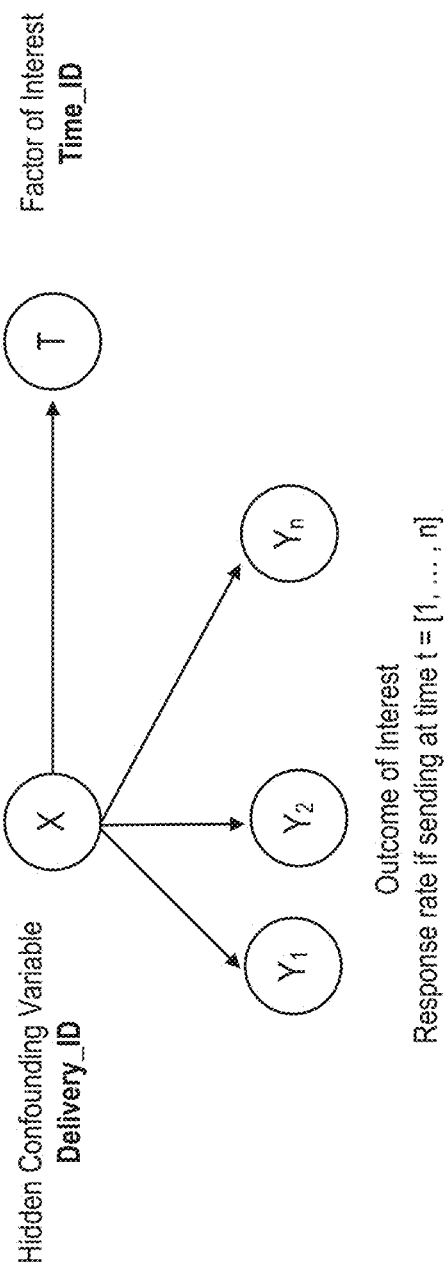
FIG. 3 includes an example of a general causal graph that illustrates the connection between several variables (i.e., Delivery_ID and Time_ID) and response rate.

The outcome of interest (Y) is the response rate. FIG. 3 includes an example of a general causal graph that illustrates the connection between the aforementioned variables (i.e., Delivery_ID and Time_ID) and response rate. The confounder (i.e., Delivery_ID) is represented by X, the factor of interest (i.e., Time_ID) is represented by T, and the potential outcome had the message been sent at time $t=[1, \ldots, n]$ is represented by $Y_t$. As can be seen in FIG. 3, the factor of interest (T) and the potential outcome ($Y_t$) are affected by the confounder (X).

Causal inference relies on two basic assumptions. First, that there are no unmeasured confounders: $(Y_1, \ldots, Y_n)$ ⊥ T|X. This means that conditioning on X, $Y_t$, and T are independent without influence from other unmeasured confounders. Second, that there is common support: $P(T=t|X=x)>0$, $\forall t,x$. This means that for each $x \in X$, the marketing platform should have data indicating the potential outcome (Y) for all treatments (T). In reality, this is almost impossible to satisfy due to the constraints of the source data available to the marketing platform. However, violations of this assumption can be remedied by ML techniques to some extent. Further details regarding how to incorporate models into the causal inference framework are provided below.

The expected value (E) of the response rate (Y) at send time (t) can be denoted by the marketing platform as $E[Y_t]$. At a high level, the goal of the marketing platform is to discover the send time that results in the highest expected value as follows:

$$T = \text{argmax}_t E[Y_t]. \qquad \text{Eq. 1}$$

Several different causal inference approaches may be employed to calculate $E[Y_t]$.

The first causal inference approach is covariate adjustment. Covariate adjustment is a statistical approach in which $E[Y_t]$ is split into two conditional expectations using a truncated formula (also referred to as the "g-formula") as follows:

$$E[Y_t] = E_{x \sim p(x)}[E[Y_t|x, T=t]]. \qquad \text{Eq 2}$$

The first step is to estimate the inner expectation as a function of x and $t-f(t,x)=E[Y_t|x,T=t]$—using a model. For example, the inner expectation may be estimated using a model that employs logistic regression, matrix factorization, or a gradient boosting machine (GBM). The second step is to estimate p(x) from the source data and then marginalize x to obtain $E[_t]$.

The second causal inference approach is inverse-probability weighting (also referred to as "inverse-propensity weighting"). Such an approach removes the confounding effect by reweighting samples to essentially create a pseudo-randomized trial. Propensity scores are representative of probabilities of selecting a particular treatment given certain value(s) for covariate(s). Formally, the definition of each propensity score is the conditional probability of a message being sent at time t given a fixed value X for the confounder. That is, P(T=t|X). Much like covariate adjustment, there are two steps to inverse-probability weighting. The first step involves estimating the propensity score. The second step involves reweighting samples by the inverse propensity score of the treatment t received and then integrating the weighted outcome as follows:

$$E[\hat{Y}_t] = \frac{1}{n} \sum_{i, T_i = t} \frac{y_i}{\hat{P}(T_i = t | X_i)}. \qquad \text{Eq. 3}$$

The intuition behind this approach is that if the propensity score is low at time t, then the marketing platform may infer that time t has a low probability of happening. In essence, if an event is rare in the source data, then the marketing platform may assign more weight to its outcome. The opposite may also be true. If the propensity score is high at time t, then the marketing platform may infer that time t may have a higher probability of happening. Accordingly, if there are multiple similar samples in the historical data, then the marketing platform may assign less weight to the outcome. This approach results in the overall expectation of the outcome being a weighted average of the outcome for each time t. In some embodiments, the marketing platform attempts to adjust the distribution of confounder X at each time to be roughly similar. For example, the marketing platform may try to ensure that a similar distribution of the message content, as determined based on the assigned confounder variable (e.g., $Delivery\_ID_i$), are associated with each send time under consideration.

The third causal inference approach involves combining the first and second approaches. More specifically, the marketing platform may combine the first and second approaches by using the propensity score as an additional feature to model the inner expectation as follows:

$$f(t,x)=E[Y_t|x,T=t,\text{propensity score}]. \qquad \text{Eq. 4}$$

Then, the marketing platform can marginalize x to obtain $E[Y_t]$.

C. Predictive Modeling with Causal Inference Framework

As discussed above, the marketing platform must estimate $E[Y_t|x,T=t]$, $P(T=t|X)$, and $E[Y_t|x,T=t,p(t|x)]$ in order to obtain $E[Y_t]$. Since the variable representing the message content (e.g., Delivery_ID) and the variable representing the send time (e.g., Time_ID) are categorical variables, $P(T=t|X)$ is discretized and can be calculated directly. Accordingly, the marketing platform only needs to model $E[Y_t|x,T=t]$ and $E[Y_t|x,T=t,p(t|x)]$.

Figure 4:
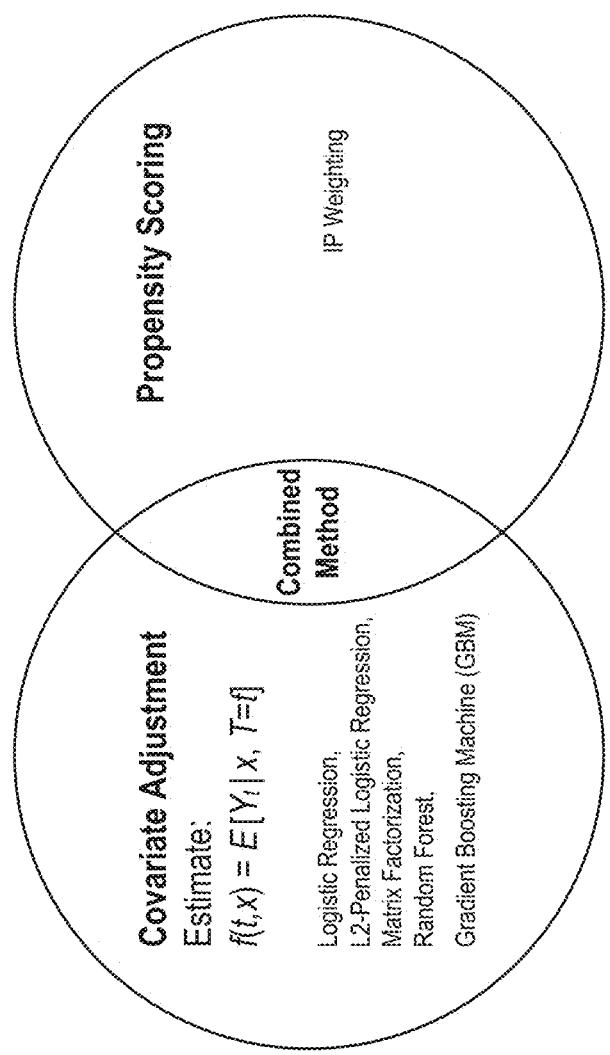
FIG. 4 identifies several models that could be used to estimate the expectation of the response rate at different times.

Models employing various techniques can be used to estimate these values. FIG. 4 identifies several models that could be used to estimate $E[Y_t|x,T=t]$ and $E[Y_t|x,T=t,p(t|x)]$. For each model, $E[Y_t]$ can be calculated using the techniques described above. Note that some models tend to perform better than others in estimating $E[Y_t|x,T=t]$ and $E[Y_t|x,T=t,p(t|x)]$. For example, models that rely on logistic regression, matrix factorization, and GBMs tend to perform better than models that rely on L2-penalized logistic regression and random forests in the context of covariate adjustment. Moreover, models designed for inverse-probability weighting tend to underperform in many scenarios. Accordingly, the marketing platform normally follows either the covariate adjustment approach or the combined approach using models that rely on logic regression, matrix factorization, or GBMs.

D. Model Robustness

The marketing platform may also evaluate the robustness of these models and performance under different scenarios (e.g., with different recipient features). As discussed above, the common support assumption requires that the marketing platform obtain source data relating to messages sent at all send times under consideration for each delivery. But this is nearly impossible in reality. Accordingly, the marketing platform may make use of the concept of data coverage, which is a measurement to address the lack of common support across the different send times.

FIG. 5 includes an example of a data structure that illustrates the concept of data coverage. Each row in the data structure corresponds to a different confounder (here, each Delivery_ID represents different content), and each column in the data structure corresponds to a different send time (here, each Time_ID represents a different send time). Said another way, each row in the data structure corresponds to a different batch of messages assumed to have the same content, while each column in the data structure corresponds to a different send time. Each value in the data structure is indicative of the response rate given the corresponding Delivery_ID and Time_ID. As can be seen in FIG. 5, some entries have values while other entries have no value. Those entries that do not have values correspond to (Delivery_ID, Time_ID) pairs for which no messages were sent. The term "data coverage" refers to the percentage of (Delivery_ID, Time_ID) pairs that have values among all possible (Delivery_ID, Time_ID) pairs.

If the marketing platform is able to obtain source data with full coverage, which means all possible (Delivery_ID, Time_ID) pairs have values, then the models are more likely to perform well. However, if the source data has less than full coverage, which is often the case, then performance is likely to drop. At a high level, the drop in performance is caused by the limited knowledge about the impact of send time on messages having different values for the confounder (e.g., different content).

To visualize the robustness of each model, the marketing platform may choose a set of source data with full coverage and then imitate different levels of data coverage by randomly selecting (Delivery_ID, Time_ID) pairs with probability $\rho$. The probability $\rho$ may be referred to as the "training proportion." For each $p \in \{20\%, 30\%, \ldots, 100\%\}$, the marketing platform can train each model and evaluate its rankings of optimal send times using defined metrics. Examples of such metrics include the lift of average precision of the top three predicted values (AP of Top 3 Lift) and the lift of the top predicted value (Top 1 Lift).

Figure 6A:
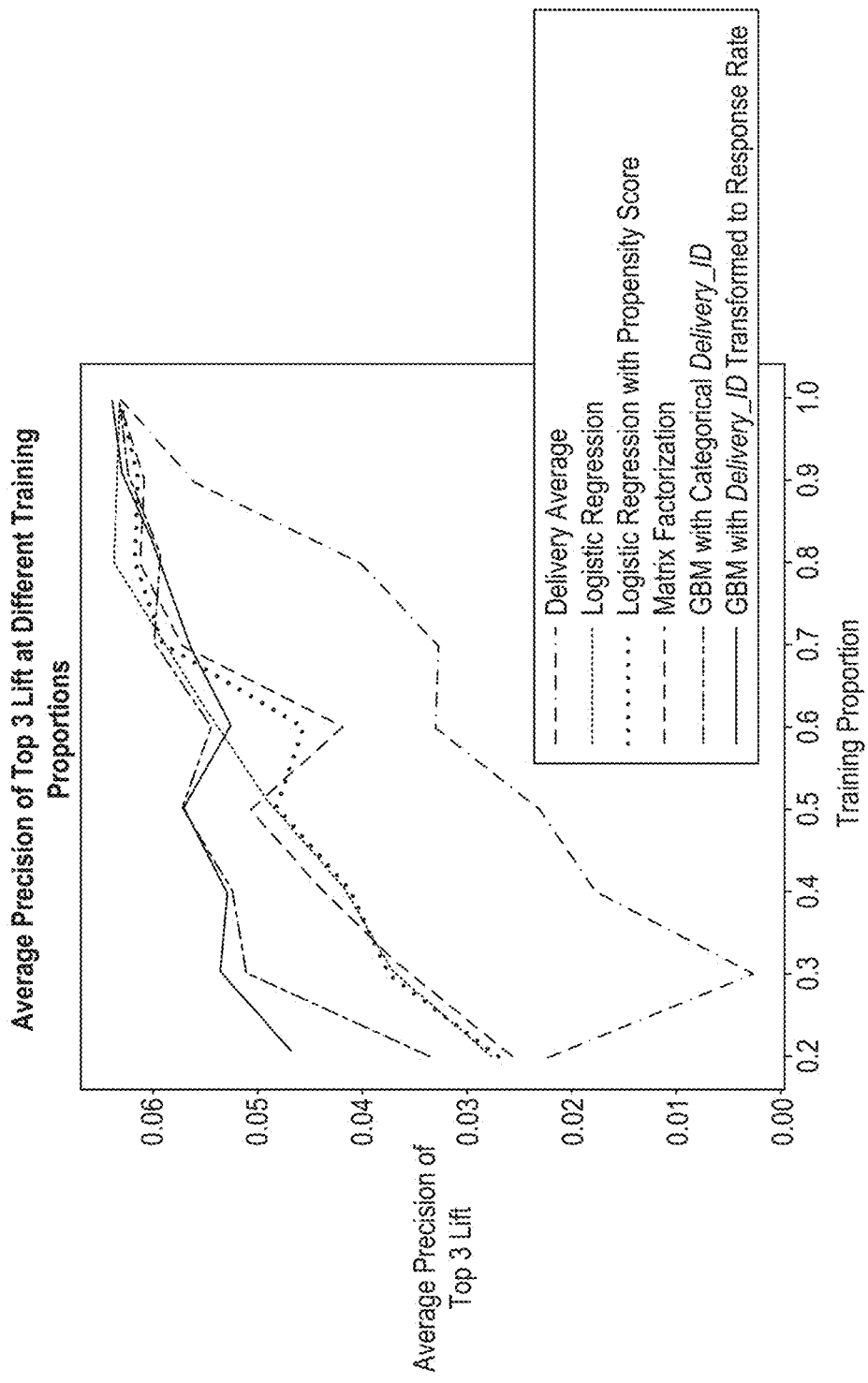
FIGS. 6A-B show the performance of various models at different levels of data coverage as defined by the training proportion.
Figure 6B:
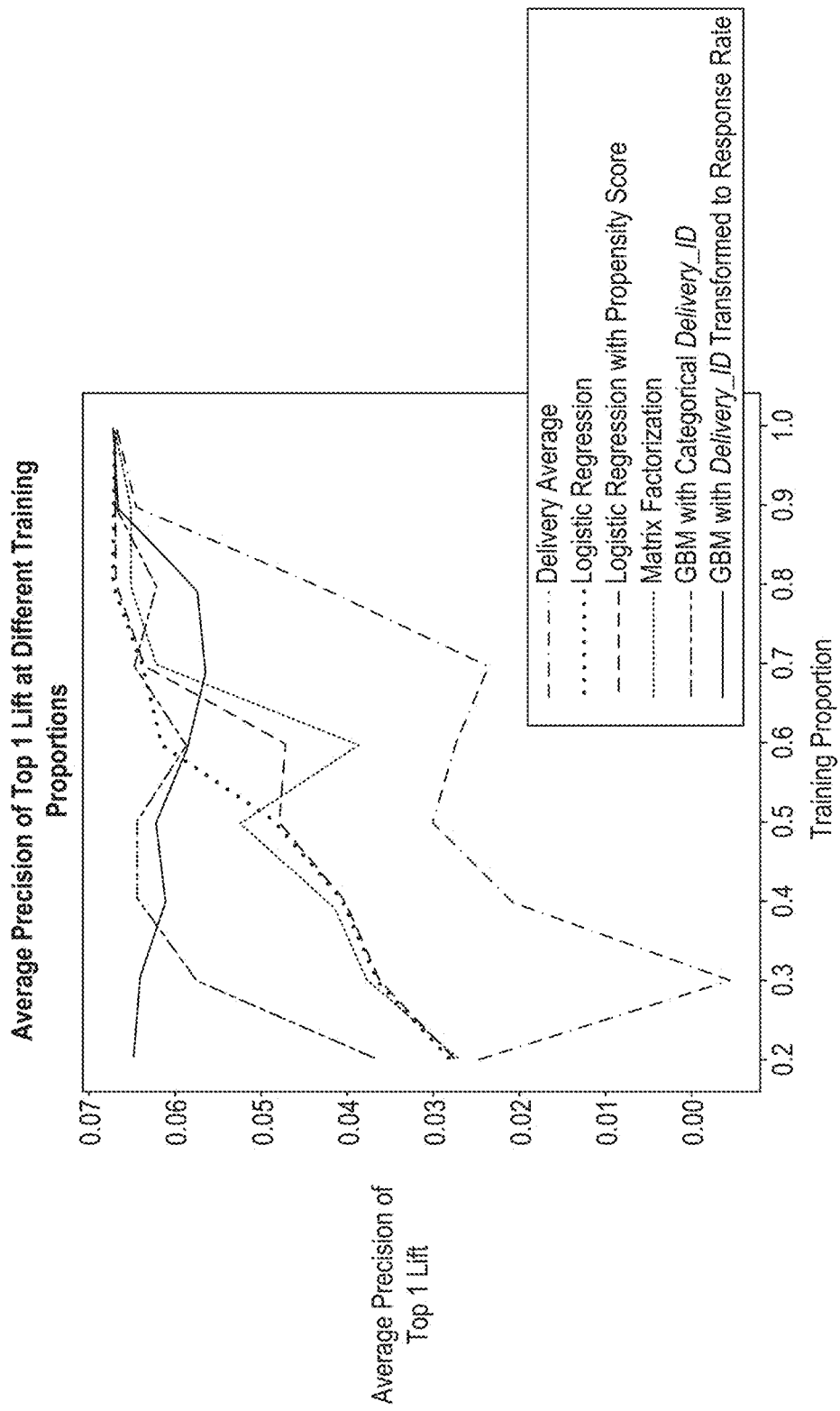

FIGS. 6A-B show the performance of various models at different levels of data coverage as defined by the training proportion. Here, the marketing platform has defined the metric by which performance is measured as the Average Precision (AP) of Top 3 Lift. To measure this metric, the marketing platform calculates the response rate and ranking correctness of the top three send times identified by the model against the average response rate of all send times. Another metric used by the marketing platform is the "Top 1 Lift". It represents the response rate lift of the recommended best send time compared with all times' average. Higher values for these metrics correspond to better performance.

Here, the models used to estimate $E[Y_t|x,T=t]$ or $E[Y_t|x,T=t,p(t|x)]$ include logistic regression, logistic regression with propensity score, matrix factorization, GBM with categorical Delivery_ID, and GBM with Delivery_ID transformed to response rate of each delivery. Meanwhile, the delivery average without imputing missing data serves as the baseline for comparison. As can be seen in FIGS. 6A-B, each model experiences a generally decreasing trend as the training proportion gets smaller. However, these models continue to exhibit higher performance than the baseline approach based on the delivery average.

In some instances, the marketing platform may want to incorporate additional features into these models. Assume, for example, that the marketing platform obtains source data that specifies, for each message, four recipient features—product, industry, purpose, and region—that are representative of categorical variables. In addition to these recipient features, the marketing platform still has one variable (TIME_ID) representative of the send time and another variable (DELIVERY_ID) representative of a hidden confounder. Moreover, assume that the marketing platform has chosen a robust model—say, a GBM-based model with Delivery_ID transformed to response rate of each delivery.

Adding additional features to estimate $E[Y_t|x,T=t]$ without caution might contaminate the ranking of send times if these recipient features are highly correlated with other confounders and not properly accounted for, or if these recipient features have a strong effect on the outcome variable which tends to make the models differentiate recipients instead of temporal preferences. Accordingly, these additional recipient features must be handled carefully. Before fitting the model, the marketing platform may individually examine the four recipient features and, if necessary, clean the recipient features with too many categories by combining multiple categories that contain relatively few recipients into one. As an example, assume that the "product" feature has several thousand categories—most of which contain just a few individuals in total. In this situation, the marketing platform may reduce the total number of categories by combining those categories with few individuals into one category (e.g., labeled "other products"). The marketing platform can then gradually add these processed recipient features into the model and monitor any changes in performance.

Results of such an approach are shown below in Table I, where each column represents the process by which an additional feature is added to a GBM-based model. The first method only uses source data from the largest category of a single recipient feature (e.g., product) to build the GBM-based model. The first method essentially serves as the baseline scenario because no extra recipient features were added. The second method adds all of the source data associated with this single recipient feature into the GBM-based model. If the first recipient feature is product, then this will cause temporal preferences to be produced for recipients across different kinds of products. For instance, a separate ordered list of optimized send times may be produced for the recipients associated with each kind of products. The third method adds source data associated with all four of the recipient features into the GBM-based model, which results in temporal preferences being produced for each group of recipients having the same product, industry, purpose, and region. As shown in Table I, both in-time (IT) and out-ot-time (OOT) performances improved as more recipient features were carefully incorporated into the GBM model.

TABLE I

Average precision of top 3 lift and top 1 lift measured for GBM-based model as additional recipient features were added.

| | Method 1 | Method 2 | Method 3 | |
|---|---|---|---|---|
| Avg. Precision of Top 3 Lift | 0.048 | 0.052 | 0.079 | IT |
| Avg. Precision of Top 1 Lift | 0.179 | 0.185 | 0.217 | |
| Avg. Precision of Top 3 Lift | 0.026 | 0.023 | 0.037 | OOT |
| Avg. Precision of Top 1 Lift | 0.101 | 0.106 | 0.154 | |

Figure 7:
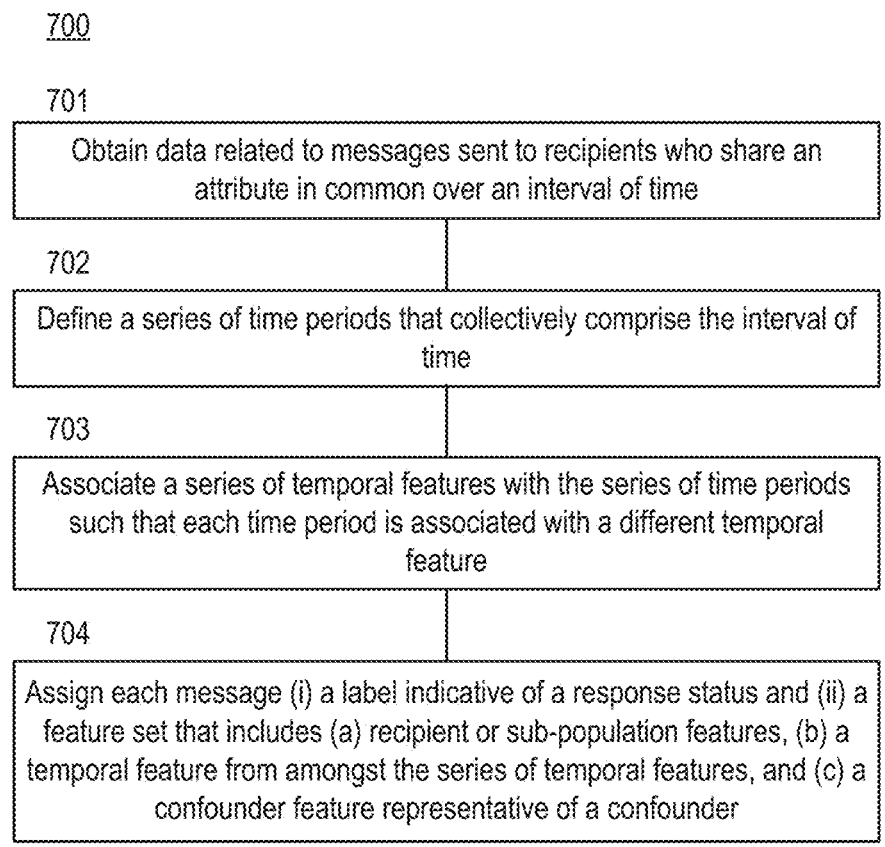
FIG. 7 depicts a flow diagram of a process for processing source data related to messages sent to recipients.

FIG. 7 depicts a flow diagram of a process 700 for processing source data related to messages sent to recipients. For simplicity, the process 700 is described in the context of messages sent to recipients who share an attribute in common. However, those skilled in the art will recognize that, as discussed above, the source data could include information on messages sent to recipients associated with different geographical regions, age ranges, genders, industries, products, etc.

Initially, the marketing platform can obtain source data (or simply "data") related to messages sent to recipients who share an attribute in common over an interval of time (step 701). In some embodiments, this information is readily accessible to the marketing platform since the marketing platform was responsible for sending those messages. In other embodiments, this information is acquired by the marketing platform from some other source. For example, the data could be acquired from a network-accessible storage medium via an application programming interface (API). The network-accessible storage medium may be associated with an enterprise (also referred to as a "company") whose products are described in the messages or an advertising platform responsible for sending the messages.

The marketing platform can define a series of time periods that collectively comprise the interval of time (step 702). In some embodiments, the marketing platform is configured to receive input indicative of a desired temporal granularity and then define the series of time periods based on the desired temporal granularity. The desired temporal granularity could be manually specified by a user via an interface, or the desired temporal granularity could be automatically specified by the marketing platform. For example, if the messages were sent over the course of a week, then the marketing platform may define 24-hour time periods with the assumption that behavior is likely to repeat on a daily basis. As another example, if the messages were sent over the course of a month, then the marketing platform may define 168-hour time periods with the assumption that behavior is likely to repeat on a weekly basis. Thereafter, the marketing platform can associate a series of temporal features (also referred to as "temporal variables") with the series of time periods such that each time period is associated with a different temporal feature (step 703). Thus, each 24-hour time period defined for a weeks' worth of messages may be assigned one the following temporal features: Time_ID$_1$, Time_ID$_2$, Time_ID$_3$, Time_ID$_4$, Time_ID$_5$, Time_ID$_6$, or Time_ID$_7$.

As discussed above, the data is generally comprised of raw message data and/or raw delivery logs. Accordingly, the marketing platform may assign, based on the data, each message (i) a label indicative of a response status and (ii) a feature set that includes (a) recipient or sub-population features, (b) a temporal feature from amongst the series of temporal features based on a time at which the message was sent, and (c) a confounder variable representative of a confounder for which information is not included in the data (step 704).

Figure 8:
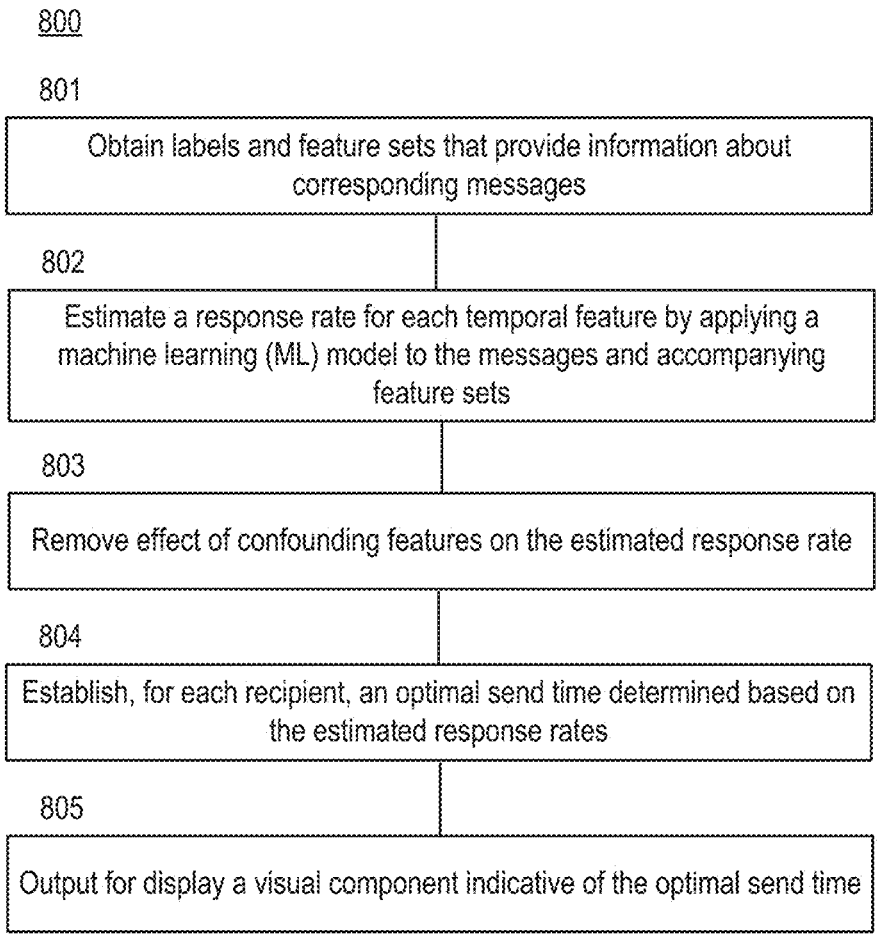
FIG. 8 depicts a flow diagram of a process for establishing the optimal time to send a message to a recipient having a known attribute.

FIG. 8 depicts a flow diagram of a process 800 for establishing the optimal time to send a message to a recipient having a known attribute. Initially, a marketing platform can obtain labels and feature sets that provide information about the messages (step 801). These feature sets may have been produced by the marketing platform as discussed above with respect to FIG. 7.

Thereafter, the marketing platform can estimate a response rate for each temporal feature in the series of temporal features by applying a model to the labels and accompanying feature sets (step 802). As discussed above, the model may be designed and trained to produce an estimated response rate as output given the labels and feature sets as input. In some embodiments, the marketing platform establishes an expectation of receiving a response to a new message addressed to a recipient having the known attribute by marginalizing the hidden confounders (step 803) to get the effect of the series of temporal features on the response rate. This expectation represents the likelihood that the recipient will respond at all for a message sent at time t, regardless of the message content.

The marketing platform may establish, for each recipient, an optimal send time based on the estimated response rates for a series of temporal features (step 804). Generally, the optimal send time is whichever temporal feature is associated with the highest estimated response rate for that recipient. In some embodiments, the marketing platform stores the optimal send times. For example, the marketing platform may store each optimal send time in a profile maintained for the corresponding recipient. The marketing platform may also output for display a visual component indicative of the optimal send time (step 805). For example, the marketing platform may identify the time period corresponding to the temporal feature having the highest estimated response rate, the time periods corresponding to the temporal features having the three highest estimated response rates, etc. As another example, the marketing platform may present information regarding the entire list of temporal features ordered based on the estimated response rates. Generally, the marketing platform only stores the optimal send time of each recipient to save on space; however, the marketing platform could store the ordered list of temporal features if, for example, further analysis may be performed.

Other steps may also be included in some embodiments. For example, the marketing platform may associate the optimal send time with the attribute of the recipients to whom the past messages were sent (e.g., in a data structure) and then store the optimal send time for each recipient in a database or storage account. Upon receiving input indicative of an interest in transmitting a new message to a recipient having the attribute, the marketing platform may obtain the recommended optimal send time for this recipient. In some embodiments, the marketing platform causes display of information related to the optimal send time. In order embodiments, the marketing platform provides a recommendation regarding the new message. For example, the marketing platform may recommend that the new message be transmitted at a given time corresponding to the temporal identifier having the highest estimated response rate.

Mimic A/B Test for Evaluating Marketing Strategies

Field experiments in which treatments from a treatment space are randomly assigned to recipients are widely used in marketing. The purpose of a field experiment is to randomly vary the treatments assigned to recipients in order to learn which treatment performs the best. Beyond that, marketers may be interested in customizing marketing strategies by choosing different treatments for different segments of recipients. For instance, marketers may customize marketing strategies based on the gender, age, or location of recipients.

As discussed above, models may be developed to recommend a personalized treatment with the expectation of optimizing a certain performance metric, such as the response rate to messages. One difficulty that is encountered while developing models is evaluating these models against one another in an effort to improve upon the performance metric. Traditional offline evaluation approaches that rely on historical data tend to be inaccurate since not all possible treatments in a treatment space will have been explored. True evaluation can only be achieved through A/B testing. A/B testing (also referred to as "bucket testing" or "split-run testing") is a way to compare two versions of a single variable (e.g., send time), typically by testing recipients' responses to a first variant (e.g., a first send time) and a second variant (e.g., a second send time) to determine which variant is more effective. However, A/B testing is costly and slow to iterate as a marketing platform needs to wait for outcomes and then redo each A/B test whenever one of the models under consideration is changed.

Introduced here, therefore, is an approach to performing offline evaluations that mimic A/B tests using data related to an existing field experiment. For simplicity, the approach may be described in the context of comparing models in order to optimize a personalized messaging strategy employed by a marketing platform (also referred to as a "messaging system"). However, the approach may be useful in a variety of contexts as further discussed below.

The marketing platform may help marketers engage with a target audience of individuals by sending messages via email, push notification, text, or some other channel. As discussed above, models may be developed in an effort to optimize a desired outcome by personalizing the content of these messages based on recipients' preferences, choosing an appropriate channel, and selecting an optimal send time. The approaches described herein can be used to compare a pair of models using offline data. Currently, there are two popular methods for comparing different models that recommend treatments in an effort to optimize business processes.

The first method is performing a true A/B test. This method is reliable and widely used. However, A/B testing is costly and slow to iterate as pairs of models must be compared against one another. For example, in the context of optimizing send time for messages, a marketing platform would need to send messages to recipients in accordance with their personal optimal send times—usually over the course of a day—and then wait several more days to collect the responses. Moreover, if the model is altered, the existing results are largely meaningless, so the entire process would need to be started once again. Existing results are simply not useful in evaluating new models or variations of existing models.

The second method involves using offline data to compare the average value of a personalized metric. In the context of optimizing send time for messages, examples of such metrics include the Area Under Curve (AUC) score, top 1 lift score, and top 3 lift score. The term "lift score" refers to the improvement of the response rate of a given number of recommended send times (here, 1 or 3) over the average rate. There are several disadvantages to this method, however. First, these personalized metrics can only be calculated for part of the population of recipients. For example, only those recipients who have open and not-open history will have a valid AUC score, while only those recipients who have open history will have a valid top 1 lift score. Since many recipients will not respond to any messages sent by the marketing platform, these metrics may fail to take a significant percentage of recipients into account. Second, these personalized metrics often do not have a straightforward relationship with the metrics that marketers tend to care about, such as the level of engagement (e.g., as measured by open rate or click rate) with messages send in accordance with recommendations produced by a model designed to predict optimal send times. In fact, the highest personalized metric does not necessarily mean that the corresponding model actually increased the response rate the most.

To avoid these problems, a marketing platform can use offline data associated with a field experiment to mimic a true online A/B test. In a field experiment, recipients randomly adopt a treatment out of all possible treatments that can be recommended by a model. The mimic treatment group is defined to include recipients in the field experiment that happened to adopt the treatment recommended by the model to be evaluated. Thus, the mimic treatment group is a subset of the original field experiment.

To compare a pair of models, the marketing platform can select as a first treatment group (also referred to as the "control group") a subset of the field experiment whose treatment matches the ones recommended by a first model and select as a second treatment group another subset of the field experiment whose treatment matches the ones recommended by a second model. Note that if manual selection (also referred to as "human strategy") replaced one of the models, the marketing platform could also compare human strategy against a model.

Such an approach provides several advantages, including:

Interpretable: The marketing platform is able to directly estimate metrics of interest (e.g., response rate) much like a true online A/B test. In comparison to conventional offline methods that use rank-based metrics, the metrics produced by the mimic A/B test are more straightforward and easier to interpret.

Efficient: A true online A/B test is costly and time consuming. In the context of optimizing send time, for example, a marketing platform would need to send messages to different recipients in accordance with their personal optimal send time—usually over the course of several days or weeks—and then wait several weeks or months to collect the responses. But these durations make it nearly impossible to launch online A/B tests for new marketing strategies. Since the mimic A/B test uses only offline data, the approaches discussed herein are useful for efficiently iterating new marketing strategies and screening out bad models (e.g., before launching true online A/B tests).

Informative: When the size of the mimic treatment group is large enough, the approaches described herein not only provide the estimation of the metric of interest, but also allow for more inference, for example, in terms of uncertainty quantification.

Reliable: Comparisons of the results of the mimic A/B tests and true A/B tests show that the conclusions are quite reliable. That is, the mimic A/B tests generally come to similar conclusions as the true A/B tests.

Flexible: Besides models designed to propose optimal send times for messages, the approaches described herein can be used to evaluate any model or algorithm designed to produce personalized recommendations as long as (1) a field experiment exists and (2) the size of candidate treatments is relatively small in comparison to the size of the field experiment. For example, these approaches could help message optimization extend beyond send time, expanding the treatment space from hours in a day to hours in a week, combined with variants of message content and variants of communication channel. As further discussed below, the mimic A/B test could be applied in evaluating customized promotion strategies and advertising strategies. In addition to marketing strategy, these approaches can be widely applied to other fields of study, such as personalized medicine, personalized nutrition planning, personalized diet management, and the like.

Digital marketing strategies can be "personalized" in the sense that different treatments could be systemically assigned to recipients. While this is normally accomplished using models, it could also be accomplished using heuristics defined based on human experience.

A. Introduction of Source Data

Initially, the marketing platform obtains source data (or simply "data") from which it can perform the mimic A/B test. The data includes information regarding a field experiment conducted on recipients of interest. For instance, the data may include identifiers that uniquely identify the recipients, the treatments for those recipients of all treatments of interest, and the responses of the recipients from which a metric of interest can be calculated. Note that all treatments of interest could be a subset of all possible treatments in the treatment space. Moreover, the data may include information regarding a personalized marketing strategy to evaluate. As further discussed below, the data may include the treatments recommended for the recipients by one or more models. For example, the data may specify the treatments recommended for the recipients by a first model ("Model A") and the treatments recommended for the recipients by a second model ("Model B").

B. Framework of Mimic A/B Test

Figure 9:
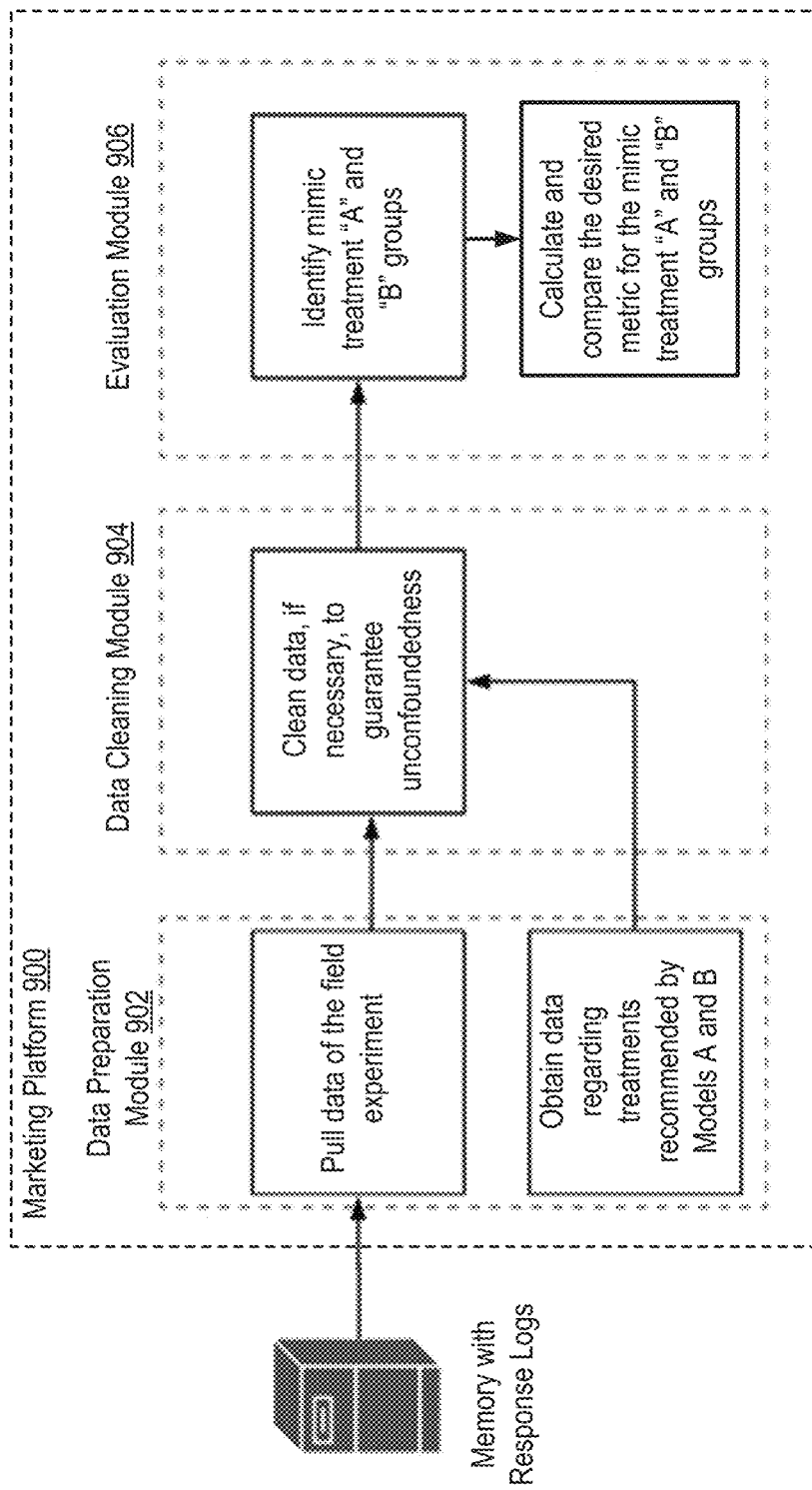
FIG. 9 depicts an example of a framework of a marketing platform able to perform mimic A/B tests.

While the general concept of mimicking an A/B test may be straightforward, the approach will be unbiased only when it is unconfounded. That is, the distribution of recipients in the field experiment must be the same as those recipients in the mimic treatment groups. The marketing platform may need to carefully check, process, and clean the source data—especially the data related to the field experiment—and the models under examination so that unconfoundedness is guaranteed. FIG. 9 depicts an example of a framework of a marketing platform 900 able to perform mimic A/B tests.

The workflow of the marketing platform 900 for comparing a first model ("Model A") and a second model ("Model B") is described below as being performed by a data preparation module 902, a data cleaning module 904, and an evaluation module 906. These modules could be implemented in a marketing platform (e.g., marketing platform 200 of FIG. 2) able to develop models for establishing the optimal time at which to send messages to recipients. Thus, the marketing platform 200 could include the modules described below in addition to, or instead of, the modules described with respect to FIG. 2.

Initially, a data preparation module 902 (or simply "preparation module") can obtain data related to a field experiment. Here, the preparation module 902 pulls data related to the field experiment from a memory that includes response logs associated with digital marketing campaigns. Each response log may identify the recipients to whom a treatment is applied, the specific treatment that was received, and how those recipients responded to the treatment. In some embodiments these response logs are created by the marketing platform 900, while in other embodiments these response logs are acquired by the marketing platform 900. For example, these response logs could be acquired from an enterprise whose products are described in the messages or an advertising service responsible for sending the messages.

As shown in FIG. 9, the preparation module 902 can also obtain data related to treatments recommended for the recipients by a first model ("Model A") and data related to treatments recommended for the recipients by a second model ("Model B"). Generally, these data identify each recipient and the treatments recommended by the first and second models. Thus, for a given recipient ("Jane Doe"), these data may specify the treatment recommended by the first model (e.g., an optimal send time of 9 AM) and the treatment recommended by the second model (e.g., an optimal send time of 10 AM). A data cleaning module 904 (or simply "cleaning module") may be responsible for examining the data obtained by the preparation module 902 to determine whether cleaning is necessary to guarantee unconfoundedness. An example of data cleaning is described below with respect to step 1003 of FIG. 10.

An evaluation module 906 can then identify a first mimic treatment group (also referred to as the "mimic treatment 'A' group") that includes recipients in the field experiment that happened to adopt the treatment recommended by the first model. Similarly, the evaluation module 906 can identify a second mimic treatment group (also referred to as the "mimic treatment 'B' group") that includes recipients in the field experiment that happened to adopt the treatment recommended by the second model. Thereafter, the evaluation module 906 can calculate a metric of interest for the first and second mimic treatment groups. By comparing the metrics of interest calculated for the first and second mimic treatment groups, the evaluation module 906 can establish whether the first model or the second model performed better.

C. Mimic A/B Test for Model Designed to Optimize Send Time

To illustrate the approach, an example scenario is described in which a marketing platform uses a mimic A/B test to evaluate a pair of models designed to predict the optimal send time for messages. Then, the accuracy of the mimic A/B test is compared against true online A/B tests.

Send time optimization aims to personally optimize the send time of messages transmitted by a marketing platform. In other words, for each recipient, the marketing platform can predict the send time at which the message is most likely to be opened. Models have been developed in an attempt to predict the optimal send time based on the historical behavior and attributes of recipients plus the content and purpose of the message. Several examples of these models are described above with respect to FIGS. 3-8.

But it can be difficult to say which model is definitively the best at predicting the optimal send time without some form of direct comparison. Mimic A/B tests represent a tool for evaluating and then comparing different models. Assume that a marking platform has performed a field experiment on a first group of recipients by randomly sending a message to those recipients over an interval of time (e.g., 24 hours) that represents the treatment space of the send time optimization problem. For a second group of recipients, the message is sent by the marketing platform at the time recommended by a model. Such a field experiment not only allows the marketing platform to gain a general understanding of which times are best and collect proper data for training models, but also makes it possible to perform mimic A/B tests.

Figure 10:
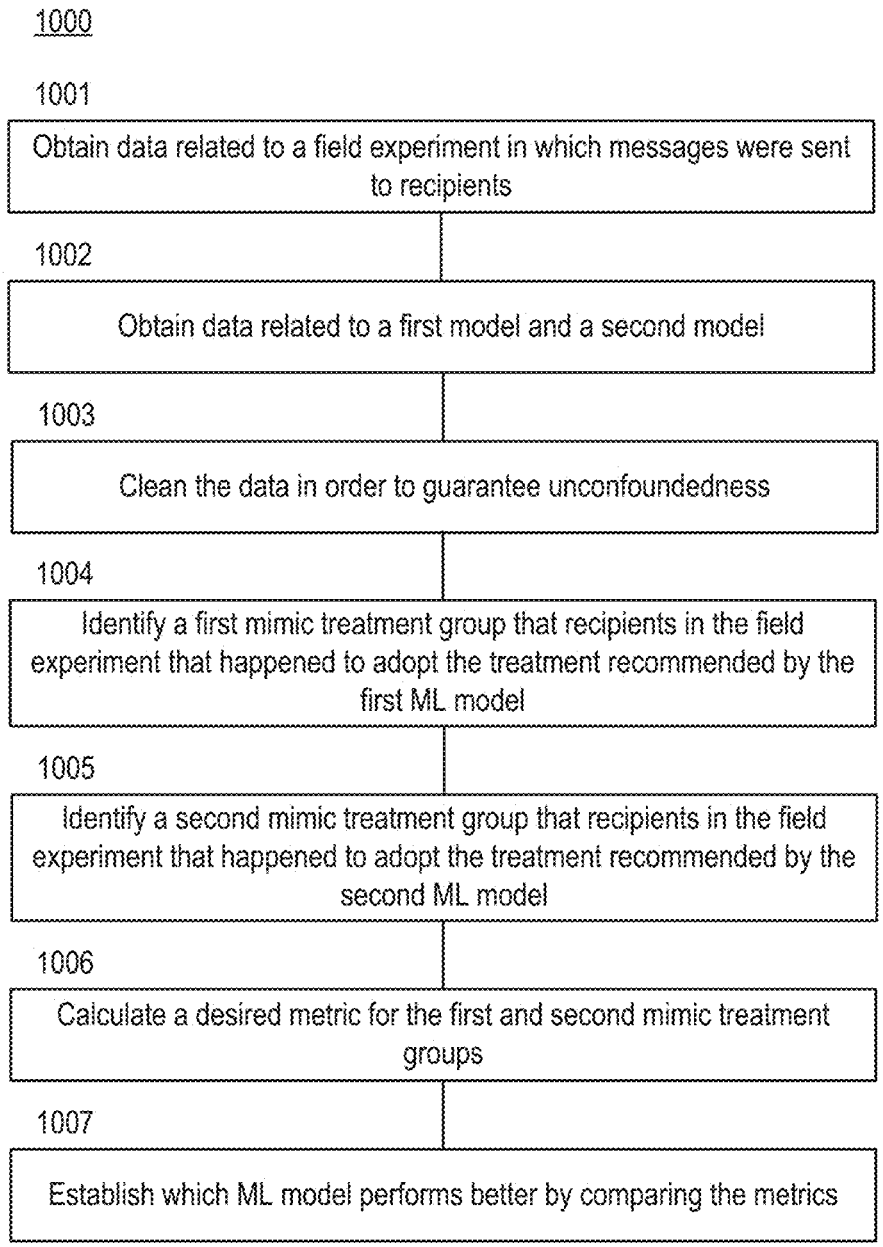
FIG. 10 depicts a flow diagram of a process for performing a mimic A/B test.

FIG. 10 depicts a flow diagram of a process 1000 for performing a mimic A/B test. Initially, a marketing platform can obtain data related to a field experiment from which it can perform the mimic A/B test (step 1001). Generally, the data includes information related to the field experiment conducted on recipients of interest, the randomized treatments of all treatments of interest, and the corresponding responses of those recipients. For example, the data may include identifiers for the recipients (e.g., email addresses), times at which messages were sent, and labels that specify whether the recipients responded (e.g., opened, clicked, or converted) to the messages.

Moreover, the marketing platform can obtain data related to a first model and a second model (step 1002). This data may include the recommendations produced by the first and second models for the recipients. For example, a first subset of the data may include the identifiers for the recipients and the send times recommended for the recipients by the first model, and a second subset of the data may include the identifiers for the recipients and the send times recommended for the recipients by the second model.

In some embodiments, the marketing platform cleans this data in order to guarantee unconfoundedness (step 1003). That is, the marketing platform may clean the data related to the field experiment and/or the data related to the first and second models to guarantee unconfoundedness between the variables represented in this data.

For example, the marketing platform either remove or downsample the buckets of time into which the messages can be sorted. The mimic A/B test may assume that messages were sent randomly and evenly over a given interval of time (e.g., 24 hours). However, this is not always the case. For example, the marketer may have begun using the marketing platform to distribute messages at 8 AM rather than 12 AM. In this scenario, the marketing platform may send all messages scheduled to be delivered between 12 AM and 8 AM at 8 AM and then send messages throughout the remainder of the day as scheduled. Thus, the probability that a recipient received the message at 8 AM is 1 in 3 while the probability that a recipient received the message any time after 8 AM is 1 in 24. This will make the mimic A/B test biased. To fix this issue, the marketing platform could avoid these kinds of field experiments for mimic A/B tests altogether. Alternatively, the marketing platform could remove/ downsample the abnormal buckets of time and then perform the mimic A/B test on the cleaned smaller interval of time.

Additionally or alternatively, the marketing platform could assign weights to multiple recommendations. If, for example, recipients have a different number of optimal send times, it will make the distribution of recipients in the whole field experiment different from those in the mimic treatment groups discussed below. This occurs because different recipients will have different probability of being included in the mimic treatment group. To fix this issue, the marketing platform could randomly select a single optimal send time for each recipient. While this approach is fairly straightforward, there is high variance due to the randomness. To have a more robust estimation result, the marketing platform could instead use a weighted combination for the desired metric. For instance, for "k" number of optimal send times—where "k" is an integer greater than 1—the marketing platform can assign a weight of 1/k to the observations in each time bucket.

The marketing platform can identify a first mimic treatment group that includes recipients in the field experiment that happened to adopt the treatment recommended by the first model (step 1004). Similarly, the marketing platform identify a second mimic treatment group that includes recipients in the field experiment that happened to adopt the treatment recommended by the second model (step 1005). That is, the marketing platform can identify the recipients who happened to receive the message at the send times recommended by the first and second models and then classify those recipients as the first and second mimic treatment groups, respectively. The first and second mimic treatment groups may represent a subset of the recipients to whom messages were sent as part of the field experiment. Thus, some recipients included in the field experiment may not be assigned to either the first mimic treatment group or the second mimic treatment group.

The marketing platform can then calculate a desired metric for each mimic treatment group (step 1006). For example, the marketing platform may establish the response rate for the first mimic treatment group based on an analysis of the field experiment data related to the recipients included in the first mimic treatment group. Similarly, the marketing platform may establish the response rate for the second mimic treatment group based on an analysis of the field experiment data related to the recipients included in the second mimic treatment group. The marketing platform can compare these metrics to establish whether the first model outperforms the second model, or vice versa (step 1007). For example, if the first mimic treatment group has a higher response rate than the second mimic treatment group, the marketing platform may infer that the first model produces better recommendations than the second model if the goal is to increase engagement.

Recall that for true A/B tests, the field experiment is performed on a portion of the recipients, which could be viewed as a first treatment group whose model is just randomized. Meanwhile, the rest of the recipients could be viewed as a second treatment group whose model was the model currently being employed by the marketing platform. The marketing platform could use this field experiment to construct a mimic treatment group as part of a mimic A/B test. Such an approach enables the marketing platform to discover whether the conclusion of the mimic A/B test is consistent with true A/B tests. That is, if the true A/B test shows that one model is significantly better than another, the marketing platform can establish whether the mimic A/B test provides the same conclusion.

For example, assume that a marketing platform performed eight true A/B tests that satisfy the following conditions:
- Groups A and B have significantly different open rates; and
- Groups A and B are from the same population of recipients according to historical open rate.

A comparison of the mimic A/B test to the true A/B tests is fair under these conditions. Table II includes the open rates and sizes of the mimic A/B test and the true A/B tests. As can be seen in Table II, seven of the eight mimic A/B tests give the same conclusion as the true A/B test (e.g., as measured in terms of which model has a better response rate) even through the size of the mimic A/B test is relatively small.

$\hat{r}_{f,i}$ while the open rate if using model g can be denoted as $\hat{r}_{b,i}$. The marketing platform can combine the I estimations as follows:

$$\hat{r}_{f,g} = \frac{\sum_{i=1}^{I}(\hat{r}_{f,i} - \hat{r}_{g,i}) * n_i}{\sum_{i=1}^{I}\hat{r}_{g,i} * n_i}, \qquad \text{Eq. 5}$$

where $\hat{r}_{f,g}$ can be interpreted as the overall percentage of increase for open rate.

While embodiments may be described in the context of optimizing the send time of messages, those skilled in the art will recognize that the approaches are similarly applicable to models designed to recommend treatments in other spaces. For example, a "recipient" may be any entity that receives a treatment recommended by a model, such as an individual who views a website, individual who receives a message, etc. A "treatment" may be any action recommended by a model to be applied to a recipient. Examples of treatments include showing a recommended product on a webpage, sending a message with recommended content, sending a message at a recommended time, and sending a message via a recommended channel.

Figure 11:
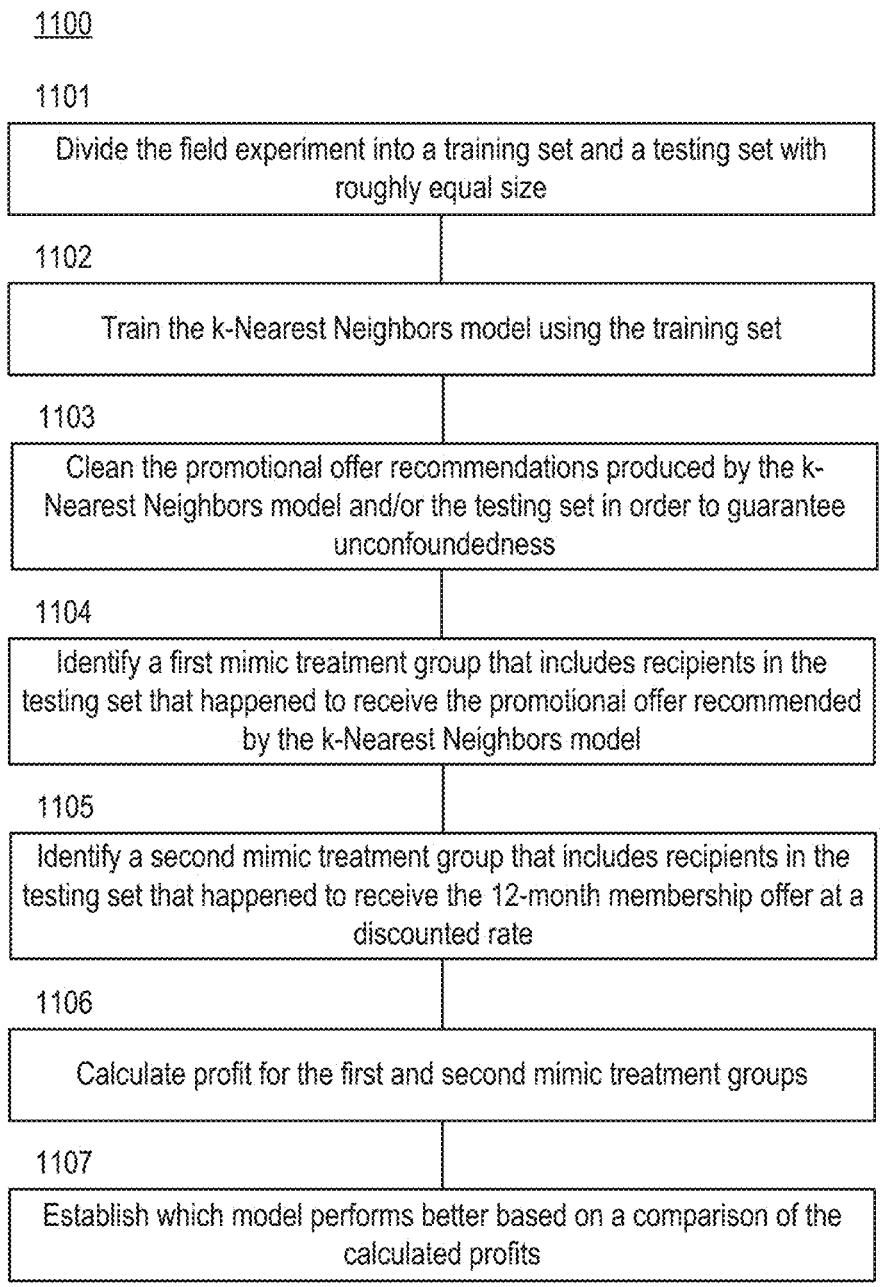
FIG. 11 depicts a flow diagram of a process for using mimic A/B tests to evaluate customized promotion strategies.
Figure 13A:
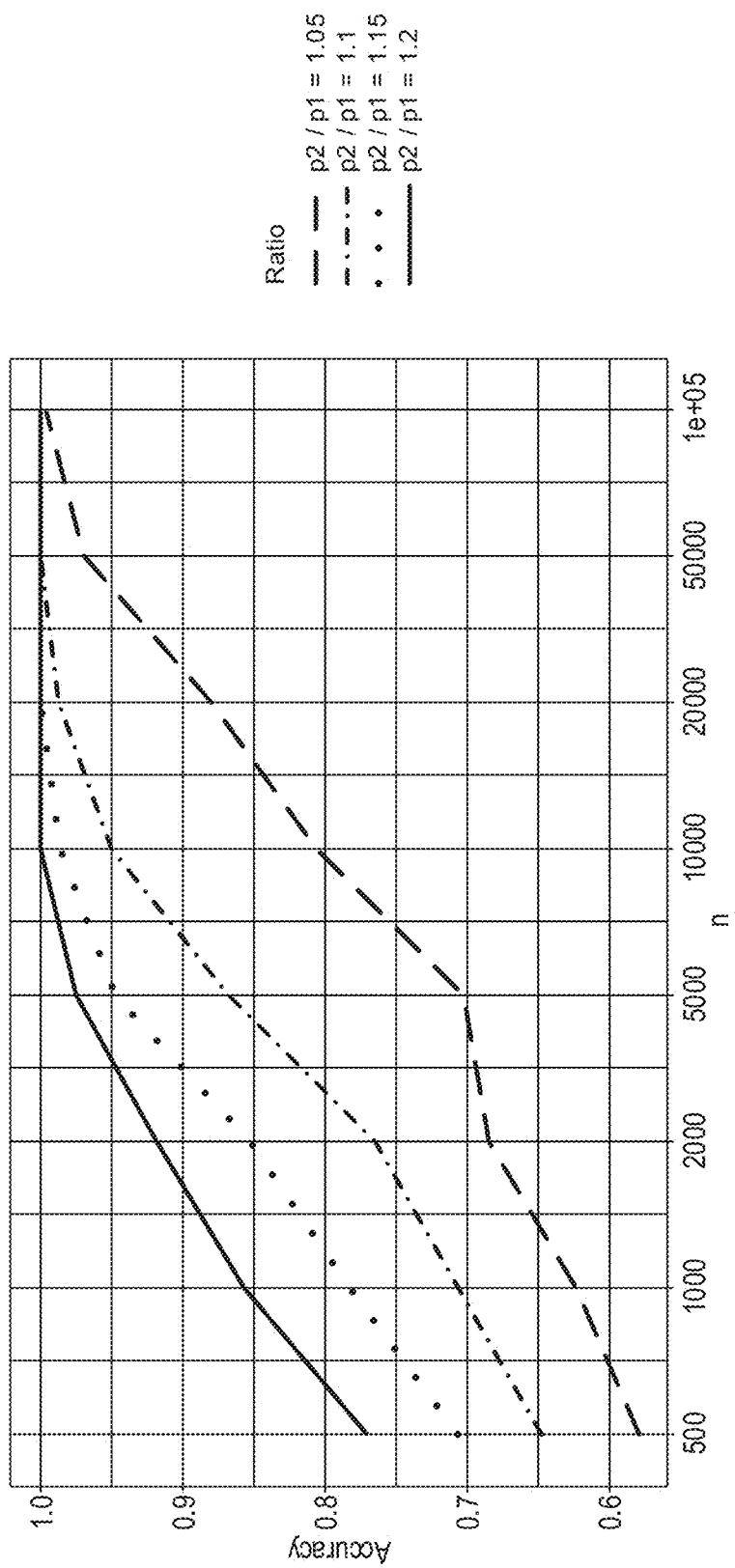
FIGS. 13A-D illustrate how the accuracy of mimic A/B tests relates to the size of field experiments for a series of fixed open rate values intuited from historical data.
Figure 13B:
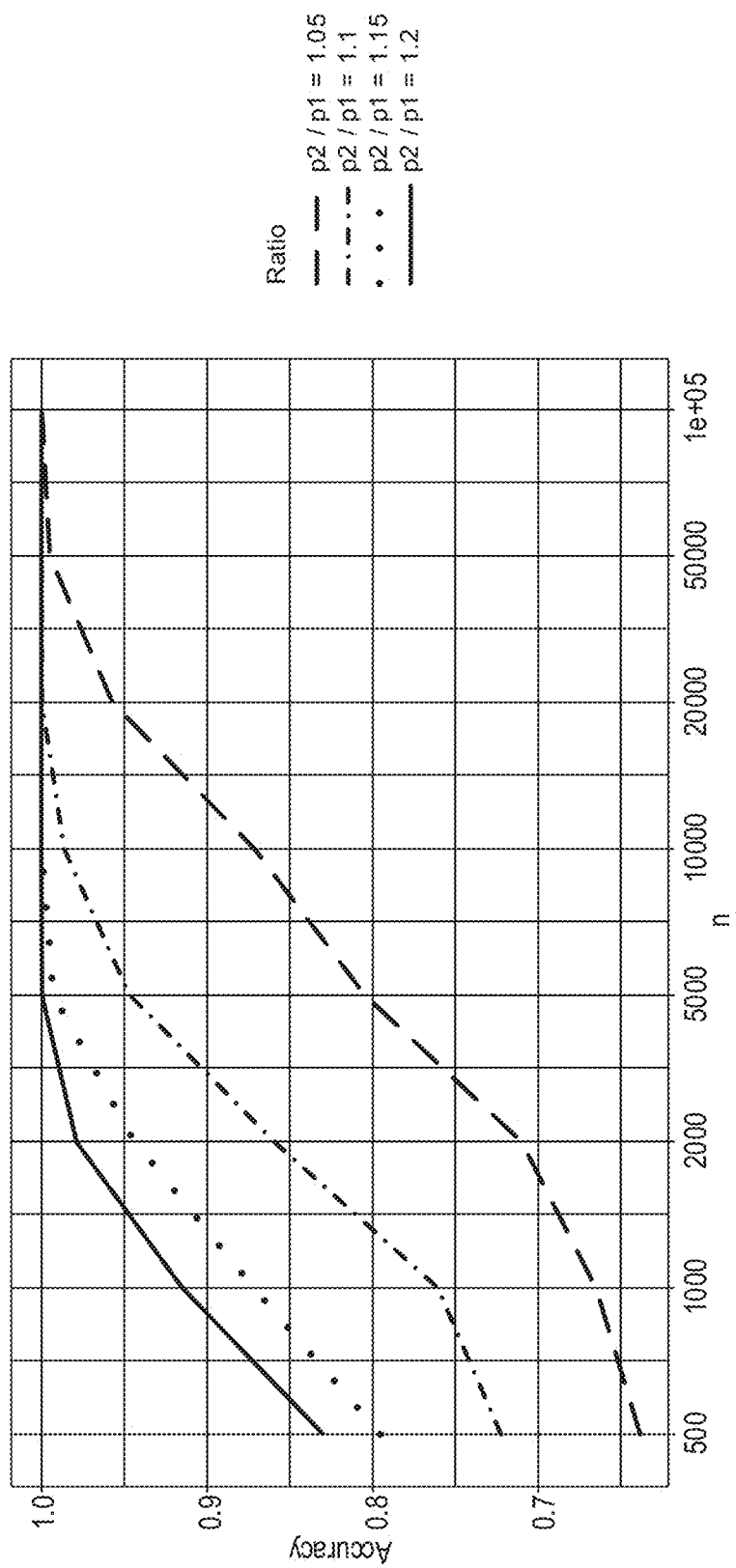
Figure 13C:
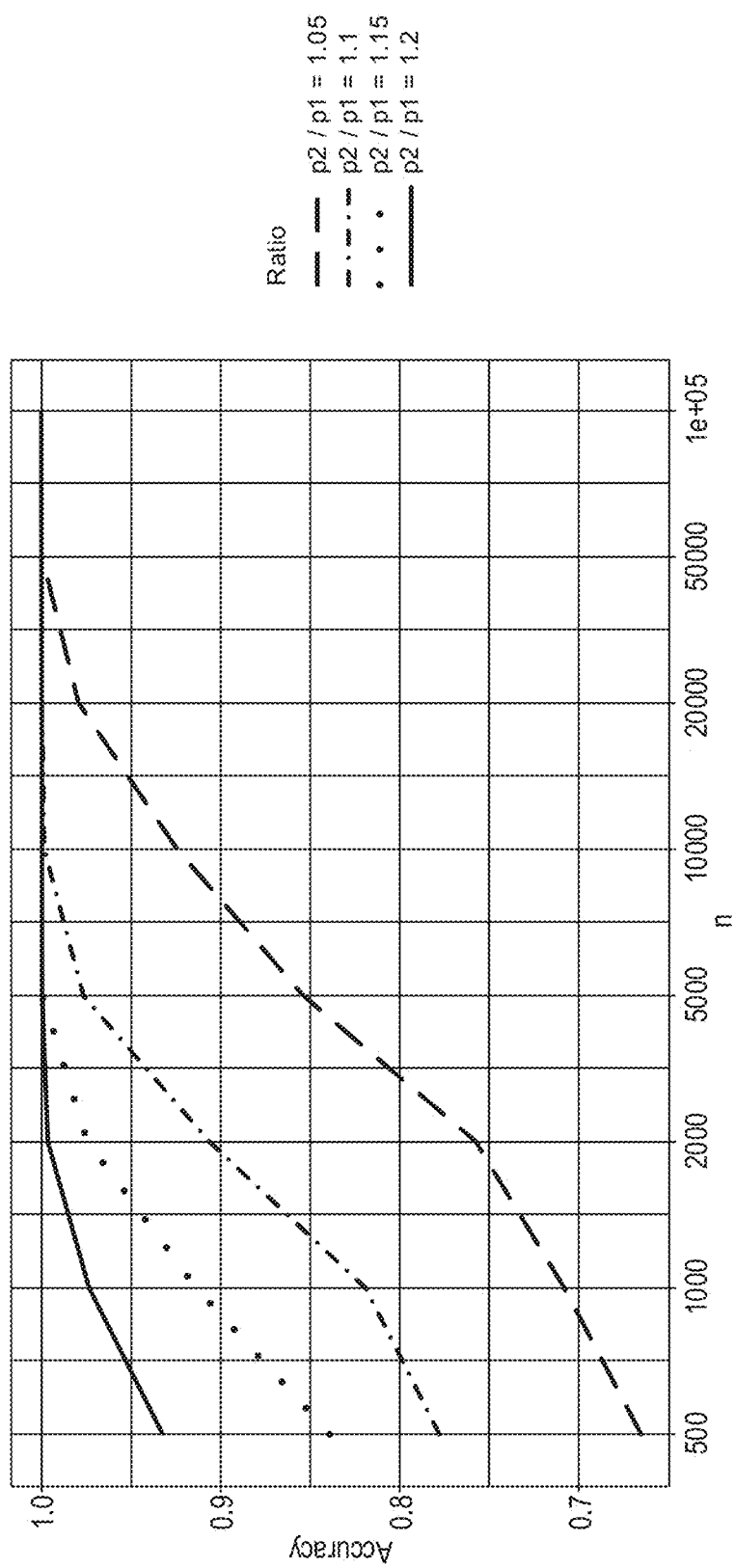
Figure 13D:
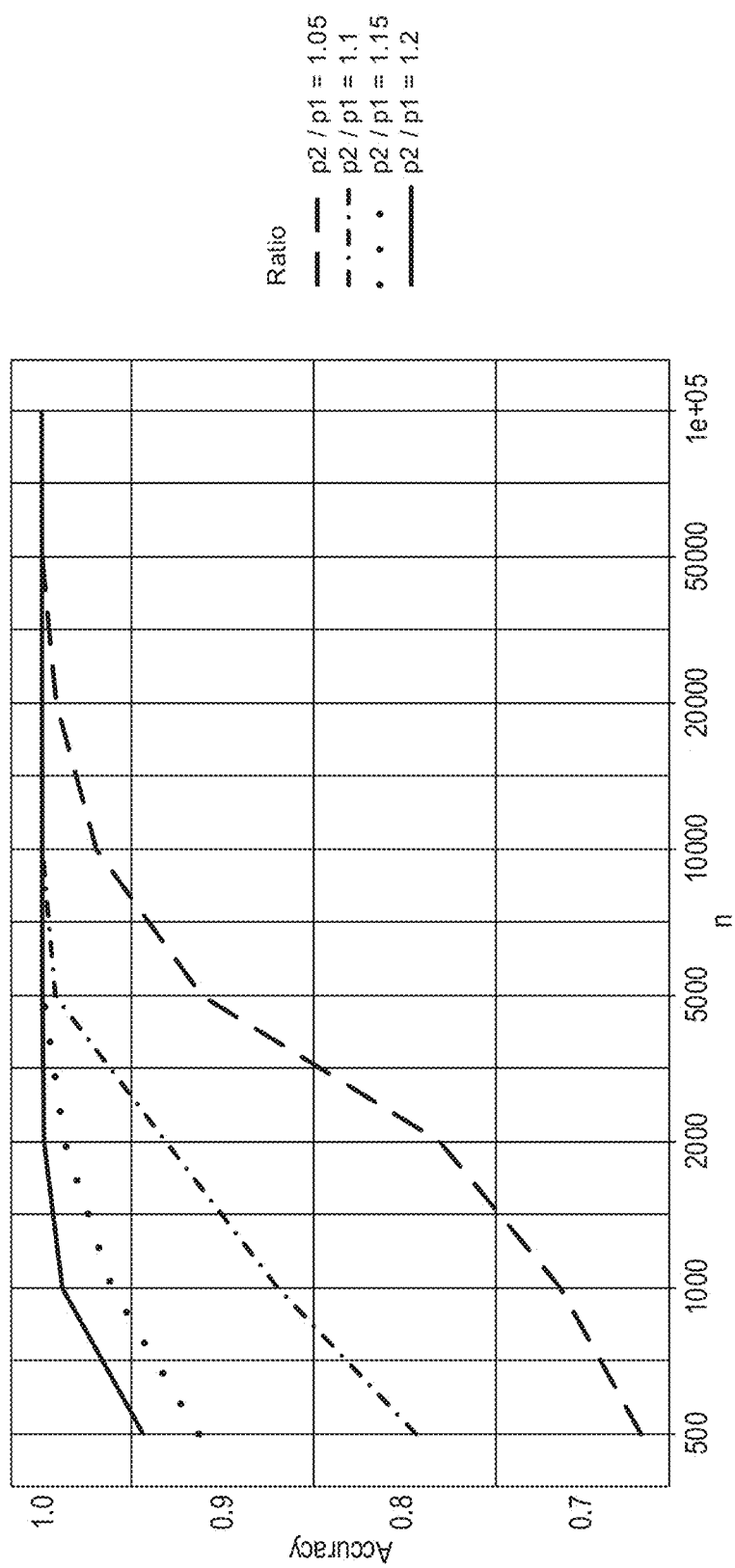

FIG. 11 depicts a flow diagram of a process 1100 for using mimic A/B tests to evaluate customized promotion strategies. Because evaluating several different strategies through true A/B tests will take several weeks or months to complete, a mimic A/B test would be an attractive choice to evaluate these customized promotion strategies in a more efficient manner.

As part of a field experiment for a customized promotion strategies, three different promotion approaches for increasing membership subscriptions for a large enterprise may be

TABLE II

Open rates and sizes of treatment groups for mimic A/B test and true A/B tests.

|  | Group A Rate | Group B Rate | Mimic Group A Rate | Mimic Group B Rate | Group A Size | Group B Size | Mimic Group A Size | Mimic Group B Size |
|---|---|---|---|---|---|---|---|---|
| A/B Test No. 1 | 0.1440 | 0.1562 | 0.1496 | 0.1562 | 328,857 | 34,938 | 1,430 | 34,938 |
| A/B Test No. 2 | 0.0546 | 0.0580 | 0.0535 | 0.0553 | 339,038 | 95,326 | 1,608 | 1,554 |
| A/B Test No. 3 | 0.1780 | 0.1743 | 0.1759 | 0.1743 | 107,473 | 41,145 | 1,700 | 41,145 |
| A/B Test No. 4 | 0.1798 | 0.1718 | 0.1976 | 0.1718 | 107,747 | 41,345 | 1,685 | 41,345 |
| A/B Test No. 5 | 0.1725 | 0.1680 | 0.1658 | 0.1680 | 108,707 | 41,637 | 1,737 | 41,637 |
| A/B Test No. 6 | 0.1539 | 0.1607 | 0.1554 | 0.1639 | 409,530 | 113,350 | 1,859 | 1,788 |
| A/B Test No. 7 | 0.0504 | 0.0475 | 0.0484 | 0.0475 | 486,317 | 69,861 | 2,893 | 69,861 |
| A/B Test No. 8 | 0.0506 | 0.0475 | 0.0531 | 0.0475 | 138,939 | 69,861 | 2,936 | 69,861 |

For each field experiment, the marketing platform can estimate the desired metric, which in this case is open rate, for a specific message. That is, the marketing platform can compare a first model f and a second model g over I messages that have a field experiment. For each message I, the send count of the field experiment can be denoted as $n_i$. Meanwhile, the open rate if using model f can be denoted as evaluated. Recipients could be randomly assigned to one of the following treatment groups: a first group that receives no promotion offer, a second group that receives a 12-month membership offer at a discounted rate, and a third group that receives a 120-day trial membership at no cost. The treatment space in this scenario is the three different approaches to increasing membership subscriptions. Note that the first approach represents a control since no action is taken other than notifying the recipients of the opportunity to purchase a membership.

The target metric may be profit, which combines the costs of delivering the messages, revenue from paid memberships, and averaged profits of purchases made in stores associated with the enterprise. To optimize the target metric, different segmentation methods could be employed using the field experiment as the training data. Examples of such segmentation methods include model-driven methods such as Lasso regression and Finite Mixture Models (FMMs), distance-driven methods such k-Nearest Neighbors, and classification methods such as Support Vector Machines (SVMs). To evaluate these approaches, true A/B tests would need to be performed for each combination of membership incentivization and segmentation method, which simply is not practical.

Using the approaches described herein, however, the field experiment could be divided into two parts—a first part used for developing the segmentation methods and a second part for evaluating these segmentation methods using mimic A/B tests. An example workflow for comparing any pair of models mentioned above, say k-Nearest Neighbors and a 12-month membership offer at a discounted rate, is provided below.

Initially, a marketing platform can randomly divide the field experiment into a training set and a testing set with roughly equal size (step 1101). If the original data of the field experiment satisfies unconfoundedness, then no extra processing is required. However, if the original data of the field experiment does not satisfy unconfoundedness, then the marketing platform may remove the effect of confounding features as discussed above. Then, the marketing platform can train the k-Nearest Neighbors model using the training set derived from the field experiment (step 1102). In some embodiments, the marketing platform may clean the promotion offer recommendations produced by the k-Nearest Neighbors model, as well as the testing set, in order to guarantee unconfoundedness (step 1103).

The marketing platform can then identify a first mimic treatment group that includes recipients in the testing set that happened to receive the promotion offer recommended by the k-Nearest Neighbors model (step 1104) and a second mimic treatment group that includes recipients in the testing set that happened to receive the 12-month membership offer at a discounted rate (step 1105). Thereafter, the marketing platform can separately calculate profit of the first and second treatment groups (step 1106). By comparing the profits, the marketing platform can establish which model results in better outcomes (step 1107).

FIG. 12, meanwhile, depicts a flow diagram of a process 1200 for using mimic A/B tests to evaluate customized audio advertising strategies employed by an Internet-based radio company that provides free ad-supported music services to its recipients. Historically, true A/B tests were the only choice for comparing different customized audio advertising strategies. However, mimic A/B tests could offer a cost-, time-, and resource-efficient solution that allows the Internet-based radio company to avoid true A/B tests.

For a company that provides free advertising-supported content, the amount of advertising is important because it is a key driver of profit but also a key driver of recipient annoyance (and thus disengagement). To balance this tradeoff, the marketing platform may perform a field experiment in which recipients are randomly divided into a predetermined number (e.g., five, seven, or nine) of treatment groups. The recipients in each treatment group may receive different amounts of audio advertising when using the music service over an interval of time (e.g., a week or a month). To better understand the heterogenous degree to which advertisements discourage engagement of different users, the marketing platform may perform a mimic A/B test. An example of a workflow for comparing a pair of customized audio advertising strategies, say a first strategy associated with a first number of ads per hour and a second strategy associated with a second number of ads per hour, is provided below.

Initially, the marketing platform can obtain data related to the field experiment (step 1201). Generally, the data includes information on the field experiment conducted on recipients of interest, the randomized treatments of all treatments of interest, and the behavior of those recipients. For example, the data may include identifiers for the recipients (e.g., account identifiers such as email addresses or usernames), the level of audio advertising, and behavior metrics such as the total number of hours listened, the number of active days per week or month, or the probability of using the music service during a given internal of time.

Moreover, the marketing platform can obtain data related to a first model and a second model (step 1202). This data may include the recommendations produced by the first and second models for the recipients. For example, a first subset of the data may include the identifiers for the recipients and the level of audio advertising recommended for the recipients by the first model, and a second subset of the data may include the identifiers for the recipients and the level of audio advertising recommended for the recipients by the second model.

The marketing platform can identify a first mimic treatment group that includes recipients in the field experiment that happened to adopt the level of audio advertising recommended by the first model (step 1203). Similarly, the marketing platform identify a second mimic treatment group that includes recipients in the field experiment that happened to adopt the level of audio advertising recommended by the second model (step 1204).

The marketing platform can then calculate a desired metric for each mimic treatment group (step 1205). In some embodiments, the metric is an explicit measure of engagement, such as the total number of hours listed per week or month. In other embodiments, the metric is an implicit measure of engagement, such as the expected profit per advertisement. The marketing platform can then evaluate the first and second models by comparing these metrics (step 1206). For example, if the first mimic treatment group has a higher average value for total number of hours listed per week than the second mimic treatment group, the marketing platform may infer that the first model results in better engagement than the second model. As another example, if the first mimic treatment group has a higher average value for expected profit per advertisement than the second mimic treatment group, the marketing platform may infer that the first model may result in better profitability than the second model (e.g., because more can be charged for advertising opportunities).

Unless contrary to physical possibility, it is envisioned that the steps described above may be performed in various sequences and combinations. For example, the marketing platform may simultaneously execute multiple instances of process 1200 of FIG. 12 in order to compare different customized audio advertising strategies.

Other steps may also be included in some embodiments. For example, the marketing platform may store the metrics calculated for the first and second mimic treatment groups in a data structure that is indicative of a profile. The profile could be associated with the first model, the second model, or the first and second models. As another example, the marketing platform may cause display of a visualization that specifies which model performed better as determined through a mimic A/B test. Additionally or alternatively, the visualization may include information regarding the treatment group associated with each model (e.g., the number of recipients, attributes of those recipients, etc.) or the metric(s) computed for each treatment group.

D. Simulation Results

A simplified simulation experiment was conducted to explore the relationship between the accuracy of mimic A/B tests and the size of field experiments. Suppose two models designed to recommend optimal send times for messages are to be compared. A first model ("Model A") has open rate $p_1$ and a second model ("Model B") has open rate $p_2$, with the ratio $p_2/p_1$ being larger than one. In other words, the second model is better than the first model at recommending optimal send times. Suppose the size of the mimic A/B test is n for each treatment group. At a high level, the mimic A/B test simulates n observations at open rate $p_1$ and another n observations at open rate $p_2$. The mean value of each treatment group can then be calculated and denoted as $\hat{p}_1$ and $\hat{p}_2$. The accuracy of the mimic A/B test may be understood as the probability that $\hat{p}_1$ is less than $\hat{p}_2$.

FIGS. 13A-D illustrate how the accuracy of mimic A/B tests relates to the size of field experiments for a series of fixed open rate $p_1$ values intuited from historical data. These fixed open rate $p_1$ values are 0.05, 0.10, 0.15, and 0.20 for FIGS. 13A-D, respectively. From these plots, it is apparent that even with small field experiments (e.g., where n equals 500) and small ratios (e.g., where $p_2/p_1$ equals 1.05), mimic A/B tests are still much better than random guessing. Meanwhile, as the size of field experiments increase and the ratio becomes larger, the accuracy approaches one with a satisfactory rate. This illustrates that mimic A/B tests are quite reliable in predicting performance.

Computing System

Figure 14:
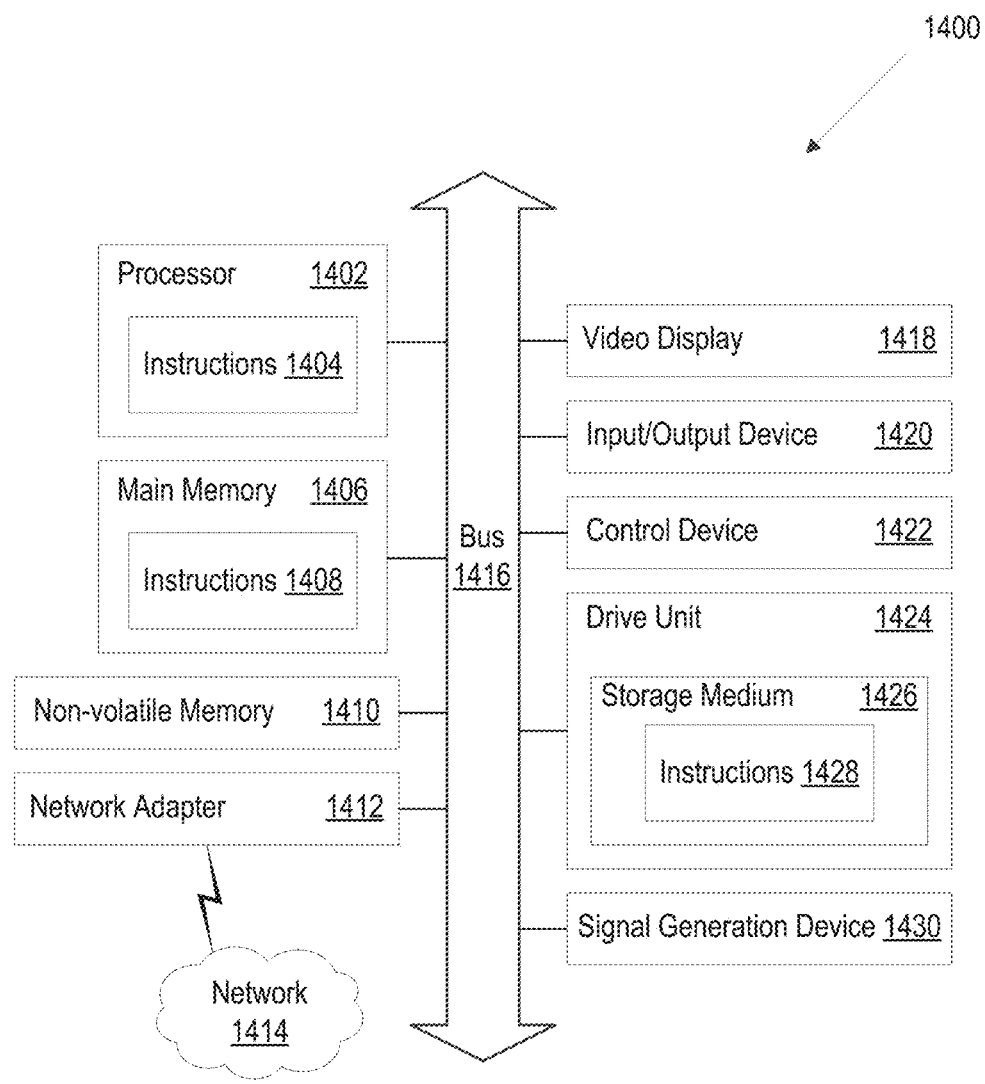
FIG. 14 is a block diagram illustrating an example of a computing system 1400 in which at least some operations described herein can be implemented.

FIG. 14 is a block diagram illustrating an example of a computing system 1400 in which at least some operations described herein can be implemented. For example, some components of the computing system 1400 may be hosted on a computing device that includes a marketing platform (e.g., marketing platform 102 of FIG. 1 or marketing platform 208 of FIG. 2).

The computing system 1400 may include one or more central processing units (also referred to as "processors") 1402, main memory 1406, non-volatile memory 1410, network adapter 1412 (e.g., network interface), video display 1418, input/output devices 1420, control device 1422 (e.g., keyboard and pointing devices), drive unit 1424 including a storage medium 1426, and signal generation device 1430 that are communicatively connected to a bus 1416. The bus 1416 is illustrated as an abstraction that represents one or more physical buses and/or point-to-point connections that are connected by appropriate bridges, adapters, or controllers. The bus 1416, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 1400 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1400.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1428. The term "machine-readable medium" and "storage medium" shall also be taken to include any medium that is capable of storing, encoding, or carrying a set of instructions for execution by the computing system 1400.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1404, 1408, 1428) set at various times in various memory and storage devices in a computing device. When read and executed by the one or more processors 1402, the instruction(s) cause the computing system 1400 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1410, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1412 enables the computing system 1400 to mediate data in a network 1414 with an entity that is external to the computing system 1400 through any communication protocol supported by the computing system 1400 and the external entity. The network adapter 1412 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1412 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
   obtaining historical data related to a set of messages sent to historical recipients over an interval of time;
   defining a series of time periods that collectively comprise the interval of time;
   associating a series of temporal variables with the series of time periods such that each time period is associated with a different temporal variable;
   assigning, to a subset of messages based on the historical data:
   (i) labels indicative of a response status, and
   (ii) feature sets that include (a) a recipient feature, (b) a temporal variable from amongst the series of temporal variables based on a time at which a message was sent, and (c) a confounder variable representative of content not included in the historical data;
   utilizing a machine-learning model to estimate response rates for the series of temporal variables based on the labels and the feature sets of the subset of messages;
   generating, for the historical recipients, optimal temporal variables based on the estimated response rates;
   receiving input indicative of an interest in transmitting a new message to a recipient associated with an attribute corresponding to a particular recipient feature of at least one historical recipient of the historical recipients;
   identifying, for the recipient, a particular optimal temporal variable corresponding to the at least one historical recipient; and
   transmitting the new message to the recipient in accordance with the particular optimal temporal variable.

2. The computer-implemented method of claim 1, wherein the labels are binary inputs whose values indicate whether a corresponding recipient opened a message.

3. The computer-implemented method of claim 1, wherein a particular confounder variable assigned to a message is based on a time at which the message was sent.

4. The computer-implemented method of claim 1, wherein messages sent at a same time are assigned a same confounder identifier.

5. The computer-implemented method of claim 1, wherein utilizing the machine-learning model to estimate the response rates comprises utilizing a logistic regression model, a matrix factorization model, or a gradient boosting machine to marginalize confounder variables for the feature sets.

6. The computer-implemented method of claim 1, further comprising:
   outputting for display a visual component that identifies an optimal time that corresponds to whichever temporal variable has a highest estimated response rate.

7. The computer-implemented method of claim 1, further comprising:
   utilizing a weighted average of the estimated response rates for the series of temporal variables to determine an expectation of receiving a response to the new message.

8. The computer-implemented method of claim 1, wherein identifying the particular optimal temporal variable for the recipient comprises identifying a temporal variable with a:
   highest estimated response rate.

9. The computer-implemented method of claim 1, wherein the attribute is a geographical region, an age range, a gender, an industry affiliation, or an interest in a product.

10. A system comprising:
    one or more memory devices comprising a machine-learning model; and
    one or more processors configured to cause the system to:
    obtain historical data related to a set of messages sent to historical recipients over an interval of time;
    define a series of time periods that collectively comprise the interval of time;
    associate a series of temporal variables with the series of time periods such that each time period is associated with a different temporal variable;
    assign, to a subset of messages based on the historical data:
    (i) labels indicative of a response status, and
    (ii) feature sets that include (a) a recipient feature, (b) a temporal variable from amongst the series of temporal variables based on a time at which a message was sent, and (c) a confounder variable representative of content not included in the historical data;

utilize the machine-learning model to estimate response rates for the series of temporal variables based on the labels and the feature sets of the subset of messages;

generate, for the historical recipients, optimal temporal variables based on the estimated response rates;

receive input indicative of an interest in transmitting a new message to a recipient associated with an attribute corresponding to a particular recipient feature of at least one historical recipient of the historical recipients;

identify, for the recipient, a particular optimal temporal variable corresponding to the at least one historical recipient; and transmit the new message to the recipient in accordance with the particular optimal temporal variable.

11. The system of claim 10, wherein the one or more processors are configured to cause the system to utilize the machine-learning model for estimating the response rates based on a covariate adjustment for confounder variables.

12. The system of claim 10, wherein the one or more processors are configured to cause the system to utilize the machine-learning model for estimating the response rates based on an inverse propensity weighting for confounder variables.

13. The system of claim 10, wherein the one or more processors are configured to cause the system to utilize the machine-learning model for estimating the response rates based on an inverse propensity weighting and a covariate adjustment for confounder variables.

14. The system of claim 10, wherein the one or more processors are configured to cause the system to utilize the machine-learning model to estimate the response rates by utilizing a logistic regression model, an L2-Penalized logistic regression model, a matrix factorization model, a random forest model, or a gradient boosting machine to marginalize confounder variables for the feature sets.

15. The system of claim 10, wherein the confounder variable represents message content hidden to the machine-learning model.

16. A non-transitory computer-readable medium comprising instructions that, when executed by at least one processor, cause a computing device to:

obtain historical data related to a set of messages sent to historical recipients over an interval of time;

define a series of time periods that collectively comprise the interval of time;

associate a series of temporal variables with the series of time periods such that each time period is associated with a different temporal variable;

assign, to a subset of messages based on the historical data:

(i) labels indicative of a response status, and (ii) feature sets that include (a) a recipient feature, (b) a temporal variable from amongst the series of temporal variables based on a time at which a message was sent, and (c) a confounder variable representative of content not included in the historical data;

utilize a machine-learning model to estimate response rates for the series of temporal variables based on the labels and the feature sets of the subset of messages;

generate, for the historical recipients, optimal temporal variables based on the estimated response rates;

receive input indicative of an interest in transmitting a new message to a recipient associated with an attribute corresponding to a particular recipient feature of at least one historical recipient of the historical recipients;

identify, for the recipient, a particular optimal temporal variable corresponding to the at least one historical recipient; and transmit the new message to the recipient in accordance with the particular optimal temporal variable.

17. The non-transitory computer-readable medium of claim 16, further comprising instructions that, when executed by the at least one processor, cause the computing device to identify information hidden to the machine-learning model as corresponding to confounder variables.

18. The non-transitory computer-readable medium of claim 16, further comprising instructions that, when executed by the at least one processor, cause the computing device to provide, for display within a graphical user interface on a client device, a visualization comprising an ordered list of potential send times that correspond to the particular optimal temporal variable for transmitting the new message to the recipient, the ordered list of potential send times being ranked according to a likelihood of eliciting a response from the recipient.

19. The non-transitory computer-readable medium of claim 18, further comprising instructions that, when executed by the at least one processor, cause the computing device to transmit the new message to the recipient in response to detecting, via the graphical user interface, a user selection of a potential send time.

20. The non-transitory computer-readable medium of claim 18, further comprising instructions that, when executed by the at least one processor, cause the computing device to extract the ordered list of potential send times from a data structure stored in a memory device.

* * * * *